(12) United States Patent
Karalis et al.

(10) Patent No.: US 8,472,771 B2
(45) Date of Patent: Jun. 25, 2013

(54) SURFACE-PLASMONODIELECTRIC-POLARITONIC DEVICES AND SYSTEMS

(75) Inventors: Aristeidis Karalis, Boston, MA (US); John Joannopoulos, Belmont, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 536 days.

(21) Appl. No.: 12/421,207

(22) Filed: Apr. 9, 2009

(65) Prior Publication Data

US 2010/0060977 A1   Mar. 11, 2010

Related U.S. Application Data

(60) Provisional application No. 61/123,603, filed on Apr. 10, 2008.

(51) Int. Cl.
*G02B 6/10* (2006.01)

(52) U.S. Cl.
USPC .......................................... 385/129; 385/131

(58) Field of Classification Search
USPC .................................................. 385/129, 131
See application file for complete search history.

(56) References Cited

U.S. PATENT DOCUMENTS

| | | | |
|---|---|---|---|
| 7,184,641 B2 | 2/2007 | Karalis et al. | |
| 7,623,745 B2* | 11/2009 | Podolskiy et al. | 385/43 |
| 7,706,653 B2* | 4/2010 | Park et al. | 385/131 |
| 2007/0196065 A1 | 8/2007 | Lee et al. | |
| 2008/0056660 A1 | 3/2008 | Lee et al. | |
| 2008/0080824 A1 | 4/2008 | Park et al. | |
| 2009/0040507 A1 | 2/2009 | VanWiggeren | |

FOREIGN PATENT DOCUMENTS

WO   WO2005111682 A2   11/2005

OTHER PUBLICATIONS

"Gain-assisted slow to superluminal group velocity manipulation in nanowaveguides," by Govyadinov et al, Physical Review Letters, vol. 97, pp. 223902-1 through 223902-4, Dec. 2006.*
"Surface plasmon waveguides with gradually doped or NiAl intermetallic compound buried contact for terahertz quantum cascade lasers," by Indjin et al, Journal of Applied Physics, vol. 94, No. 5, pp. 3249-3252, 2003.*
"Surface plasmons in thin films," by Economou, Physical Review, vol. 182, No. 2, pp. 539-554 , Jun. 1969.*
Karalis et al., "Surface-Plasmon-Assisted Guiding of Broadband Slow and Subwavelength Light in Air," Phys. Rev. Letts., V. 95, pp. 63901-1-63901-4, Aug. 2005.

(Continued)

*Primary Examiner* — Ryan Lepisto
*Assistant Examiner* — Robert Tavlykaev
(74) *Attorney, Agent, or Firm* — Theresa A. Lober

(57) ABSTRACT

There is provided a structure for supporting propagation of surface plasmon polaritons. The structure includes a plasmonic material region and a dielectric material region, disposed adjacent to a selected surface of the plasmonic material region. At least one of the plasmonic material region and the dielectric material region have a dielectric permittivity distribution that is specified as a function of depth through the corresponding material region. This dielectric permittivity distribution is selected to impose prespecified group velocities, $v_{gj}$, on a dispersion relation for a surface polaritonic mode of the structure for at least one of a corresponding set of prespecified frequencies, $\omega_j$, and corresponding set of prespecified wavevectors, where j=1 to N.

36 Claims, 7 Drawing Sheets

OTHER PUBLICATIONS

ATWATER, The Promise of Plasmonics, Scientific American, pp. 56-63, Apr. 2007.

Marell et al., "Thin Dielectric layers in active plasmonic devices," Proceedings of the 13th annual symp. of the IEEE/LEOS Benelux Chapter, Enschede, The Netherlands, pp. 183-186, Nov. 2008.

Ashall et al., Tailoring surface plasmon polariton propagation via specific symmetry properties of nanostructures, Appl. Phys. Letts., vol. 91, N. 20, pp. 203109-1-203109-3, Nov. 2007.

Karalis, Novel photonic phenomena in nanostructured material systems with applications and Mid-range efficient insensitive Wireless Energy-Transfer, ScD. Thesis, Massachusetts Institute of Technology, Cambridge, MA, pp. 1-204, Jun. 2008.

Avrutsky et al., "Highly Confined Optical Modes in Nanoscale Metal-Dielectric Multilayers," Phys. Rev. B, V. 75, No. 24, pp. 241402-1-241402-4, 2007.

Karalis et al., "Tailoring and Cancelling Dispersion of Slow or Stopped and Subwavelength Surface-PlasmonoDielectric-Polaritonic Light," Conf. on Advances in Slow and Fast Light II, San Jose, CA, Jan. 25-27, 2009, Proceedings of the SPIE, vol. 7226, Article 72260L, 2009.

Karalis et al., "Tailoring and Cancelling Dispersion of Slow or Stopped and Subwavelength Surface-PlasmonoDielectric-Polaritonic Light," Conf. on Advances in Slow and Fast Light II, San Jose, CA, Presentation Slides 1-21, Jan. 25-27, 2009.

PCT/US2009/040048, International Search Report, transmittal page, pp. 1-2, and PCT/ISA/210 patent family annex, and Written Opinion of the International Searching Authority, cover sheet, PCT/ISA/237 two pages, and Separate sheets 1-3, Mar. 2010.

Karalis, Novel photonic phenomena in nanostructured material systems with applications and Mid-range efficient insensitive Wireless Energy-Transfer, ScD. Thesis Defense presentation, Massachusetts Institute of Technology, Cambridge, MA, Slides 1-10, May 15, 2008.

Karalis, Tailoring and Cancelling Dispersion of Slow or Stopped Subwavelength Light, EOS Annual Meeting, Paris, France, Slides 1-14, Sep. 30, 2008.

Karalis, Tailoring and Cancelling Dispersion of Slow or Stopped Subwavelength Light, OSA Annual Meeting, Rochester, New York, Slides 1-14, Oct. 23, 2008.

* cited by examiner

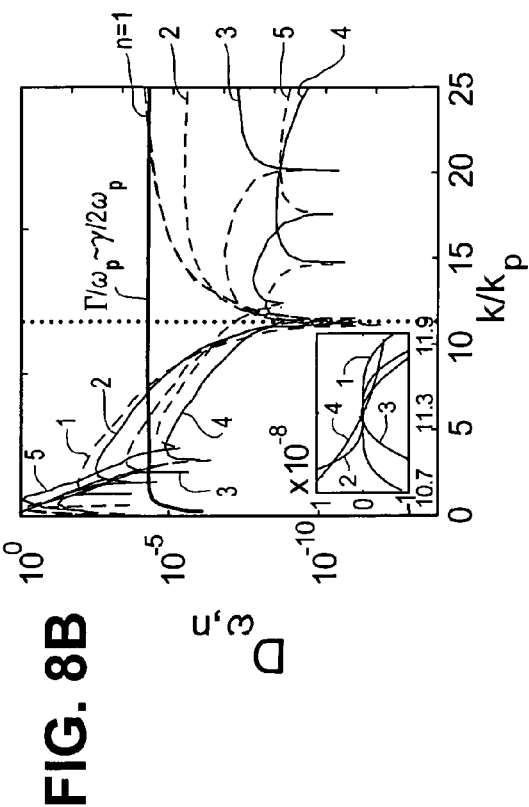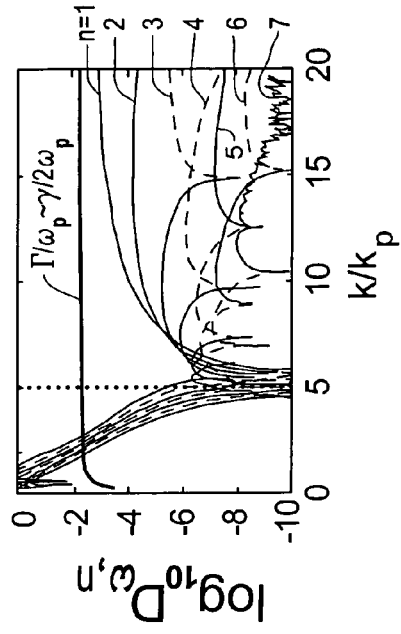
FIG. 8A  FIG. 8B
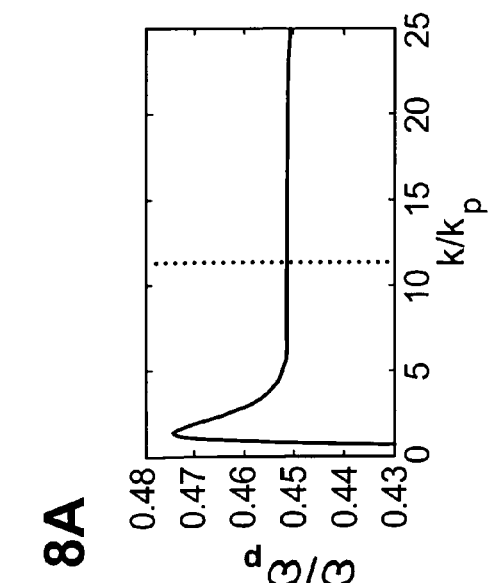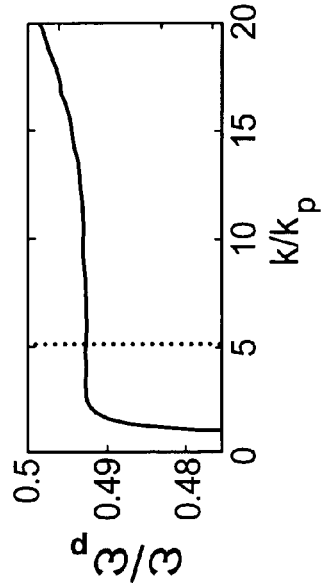
FIG. 9A  FIG. 9B

SURFACE-PLASMONODIELECTRIC-POLARITONIC DEVICES AND SYSTEMS

CROSS-REFERENCE TO RELATED APPLICATIONS

This application claims the benefit of U.S. Provisional Application No. 61/123,603, filed Apr. 10, 2008, the entirety of which is hereby incorporated by reference.

STATEMENT REGARDING FEDERALLY SPONSORED RESEARCH

This invention was made with Government support under Grant No. DMR0819762 awarded by the National Science Foundation, Grant No. DE-FG02-99ER45778 awarded by the Department of Energy, and Grant No. W911NF-07-D-0004 awarded by the Army. The Government has certain rights in the invention.

BACKGROUND OF THE INVENTION

This invention relates to photonic technology for guiding surface-plasmon-polaritons, and more particularly relates to control of dispersion in surface-plasmon-polariton propagation.

There is increasing interest in the design of surface-plasmon-polariton (SPP) photonic and optoelectronic systems; the unique light guiding properties of such SPP-based systems, such as subwavelength guiding of nanoscaled light, provide opportunities for the realization of optical processing devices and systems not previously achievable. One fundamental challenge for such modern photonic systems is the desire, for many applications, to operate as a substantially perfect light-guiding system by supporting, over a large frequency bandwidth, subwavelength modes of small group velocity and small attenuation, both substantially devoid of frequency dispersion. With such operation, a temporally- and spatially-tiny wavepacket could propagate through a photonic device without changing shape and with only a slow and uniform decrease in size. But conventional photonic systems exhibit modal dispersion that disallows such performance and that results in, e.g., limitation of the achievable so-called 'bandwidth-delay product' of the system, whereby only non-ideal wavepacket propagation is achievable.

It has been proposed to achieve control of dispersion in a photonic system by employing, e.g., coupled geometric or gain-material resonances or nonlinearities in the system design. But such configurations are limited in their applicability to general photonic device arrangements and photonic applications, including SPP-based devices and applications. As a result, many important modern optical systems, in particular those requiring slow or stopped subwavelength light, can be implemented only with suboptimal, dispersion-limited operation.

SUMMARY OF THE INVENTION

The invention provides a linear, passive material system that enables prespecified tailoring of the optical dispersion relation of the system to achieve for a supported surface plasmon polariton a desired propagation characteristic. For example, in one aspect, the invention provides a structure for supporting propagation of surface plasmon polaritons. The structure includes a plasmonic material region and a dielectric material region, disposed adjacent to a selected surface of the plasmonic material region. At least one of the plasmonic material region and the dielectric material region have a dielectric permittivity distribution that is specified as a function of depth through the corresponding material region. This dielectric permittivity distribution is selected to impose prespecified group velocities, $v_{g_j}$, on a dispersion relation for a surface polaritonic mode of the structure for at least one of a corresponding set of prespecified frequencies, $\omega_j$, and corresponding set of prespecified wavevectors, $k_j$, where $j=1$ to N.

With this design of permittivity distribution, the invention enables customization of aspects of a dispersion relation to obtain prespecified propagation SPP characteristics. For example, the permittivity distribution can be selected to impose a group velocity, $v_{g_o}$, on the dispersion relation for a surface polaritonic mode of the structure, with group velocity dispersion suppressed up to order N, for at least one of a specified frequency, $\omega_o$, and a specified wavevector, $k_o$, for a plurality of at least about N–2 separate dielectric material layers.

A wide range of photonic and optoelectronic devices and systems, such as optical delay lines, optical buffers, optical memories, light emitting diodes, solar cells, thermovoltaic devices, lasers, and other optical systems can be implemented with the structures of the invention to enable superior system performance and extended capabilities. Other features and advantages of the invention will be apparent from the following description and accompanying figures, and from the claims.

BRIEF DESCRIPTION OF THE DRAWINGS

FIGS. 8A-8B are plots of the dispersion relation and group velocity dispersion, respectively, that were characteristic of a fourth SPDP system designed with a structure like that of FIG. 1A;

FIGS. 9A-9B are plots of the dispersion relation and group velocity dispersion, respectively, that were characteristic of a fifth SPDP system designed with a structure like that of FIG. 1A;

DETAILED DESCRIPTION OF THE INVENTION

Surface-Plasmon-Polaritons (SPPs) are electromagnetic waves that propagate along the interface between a plasmonic material region and a dielectric material region that is adjacent to the plasmonic material region. By definition, the permittivity, $\epsilon_p$, of the plasmonic material is specified as $\epsilon_p<0$, and the permittivity, $\epsilon$, of the dielectric is specified as $\epsilon>0$. A SPP exists only for TM polarization, in which the magnetic field is parallel to the interface between the plasmonic and dielectric material regions, and when $\epsilon_p(\omega)<-\epsilon<0$. The $\omega$-k dispersion relation for a SPP in such a plasmonic-dielectric system is given as a function of wavevector, k, and angular frequency, $\omega$, as $k=|k|=\omega/c\cdot\sqrt{\epsilon\cdot\epsilon_p(\omega)/(\epsilon+\epsilon_p(\omega))}$, where c is the speed of light and $\epsilon_p(\omega)$ is the permittivity of the plasmonic material as a function of frequency. Here the wave vector, k, is in the plane of two-dimensional (2-d) translational symmetry.

Assuming lossless materials and using the Drude model, whereby $\epsilon_p(\omega)=\epsilon_\infty-\omega_p^2/\omega^2$, where $\epsilon_\infty$ is the permittivity of the plasmonic material at very high frequencies and $\omega_p$ is the bulk plasma frequency of the plasmonic material, then the requirement of $\epsilon_p(\omega)<-\epsilon<0$ for SPP propagation leads to a high-frequency cutoff, $\omega_c(\epsilon)$, given as $\omega_c(\epsilon)=\omega_p/\sqrt{\epsilon_\infty+\epsilon}$, to which the SPP asymptotes for large wavevectors, k, as the SPP is then tightly confined on the interface between the two material regions. The SPP asymptotes to the light-line of the dielectric, $k=\omega/c\cdot\sqrt{\epsilon}$, for small wavevectors, k, as the SPP then extends far into the dielectric material region.

In accordance with the invention, the plasmonic and dielectric material regions of a plasmonic-dielectric system are designed and arranged to cooperatively implement selected and prespecified characteristics of a dispersion relation for a surface polaritonic mode of the system, thereby enabling a correspondingly desired SPP propagation characteristic. Referring to FIGS. 1A-1F, there are illustrated various example arrangements of plasmonic and dielectric material regions that can be tailored in accordance with the invention as a Surface-PlasmonoDielectric-Polaritonic system (SPDP) to produce a selected dispersion relation. Herein the term "Surface-PlasmonoDielectric-Polaritonic system," or SPDP, will refer to the plasmonic-dielectric system provided by the invention.

The example material arrangements of FIGS. 1A-1F are schematic in that they represent configurations of material layer stacks, but are not intended to define the lateral limits of the example systems shown. Example lateral configurations of the SPDP systems for waveguiding and other applications are described in detail below.

Figure 1A:
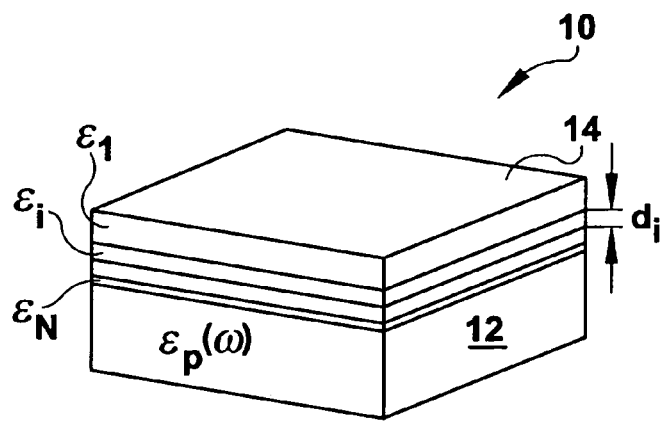
FIG. 1A is a schematic view of a first example Surface-PlasmonoDielectric-Polaritonic system (SPDP) provided by the invention, including a homogenous plasmonic material region adjacent to a layered dielectric region, configured for implementing a selected dispersion relation.

As shown in FIG. 1A, a first example SPDP system 10 provided by the invention includes a plasmonic material region 12 having a characteristic plasmonic material permittivity, $\epsilon_p(\omega)$, and a layered dielectric material region 14 including a number, N, of dielectric material layers, each layer characterized by a selected permittivity, $\epsilon_{i=1\ to\ N}$ and having a selected layer thickness, $d_{i=1\ to\ N}$.

Each dielectric layer can be provided with a distinct thickness, or two or more layers can be provided with the same thickness. Where the layer thicknesses change through the thickness of the stack, the layers do not need to progressively step from thick to thin or thin to thick from top to bottom or bottom to top; relatively thick or thin layers can be positioned in any selected order through the stack thickness. Similarly, each layer can be provided with a distinct permittivity or two or more layers can have the same permittivity.

Figure 1B:
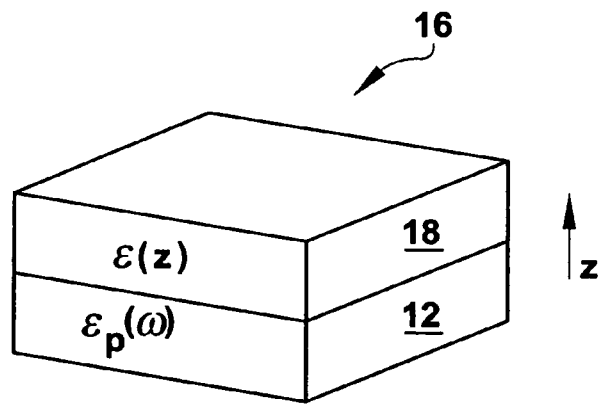
FIG. 1B is a schematic view of a second example Surface-PlasmonoDielectric-Polaritonic system (SPDP) provided by the invention, including a homogenous plasmonic material region adjacent to an inhomogeneous and continuous layered dielectric region, configured for implementing a selected dispersion relation.

As shown in FIG. 1B, in a second example SPDP system 16 provided by the invention, the dielectric material region 18 is provided on the plasmonic material as an inhomogeneous dielectric material distribution characterized by a permittivity, $\epsilon(z)$, that varies as a function of position, z, through the thickness of the dielectric material region. Here a continuous or discontinuous permittivity function, $\epsilon(z)>0$, is implemented by an arrangement of distinct materials, e.g., a stack of distinct layers, or by a single continuous material layer in which material properties change through the thickness of the material layer. The stacked layer arrangement of FIG. 1A is therefore one particular example in which a permittivity distribution through the thickness of the dielectric material region is implemented with distinct material layers.

Figure 1C:
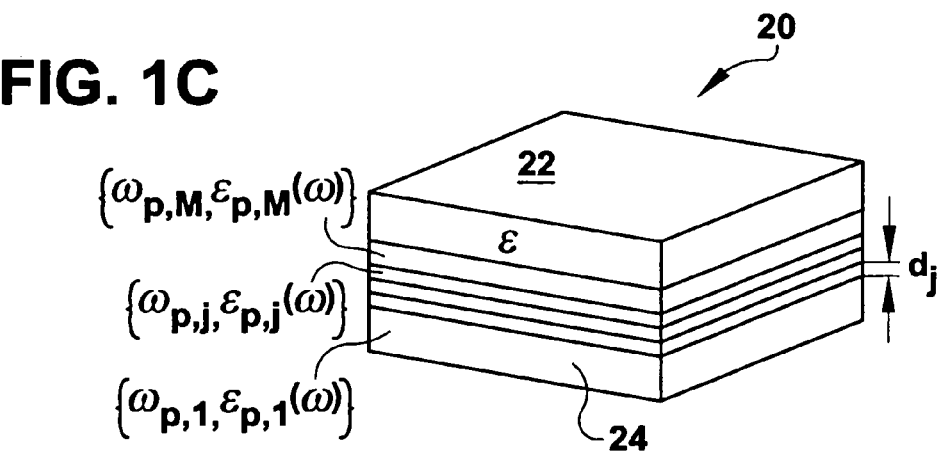
FIG. 1C is a schematic view of a further example Surface-PlasmonoDielectric-Polaritonic system (SPDP) provided by the invention, including a homogenous dielectric region adjacent to a layered plasmonic material region, configured for implementing a selected dispersion relation.

Referring to FIG. 1C, in a further example SPDP system 20 of the invention, a homogeneous dielectric material region 22 is provided adjacent to a layered plasmonic material region 24. The plasmonic material region 24 includes a number, M, of plasmonic material layers, each layer being characterized by a selected plasmonic-material permittivity, $\epsilon_{p,j=1\ to\ M}(\omega)$ and having a selected layer thickness, $d_{j=1\ to\ M}$. If the selected plasmonic-material permittivity can be approximated by the Drude model, then it can be described by a selected high-frequency plasmonic-material permittivity, $\epsilon_{\infty,j=1\ to\ M}$, and bulk plasma frequency, $\omega_{p,j=1\ to\ M}$.

Figure 1D:
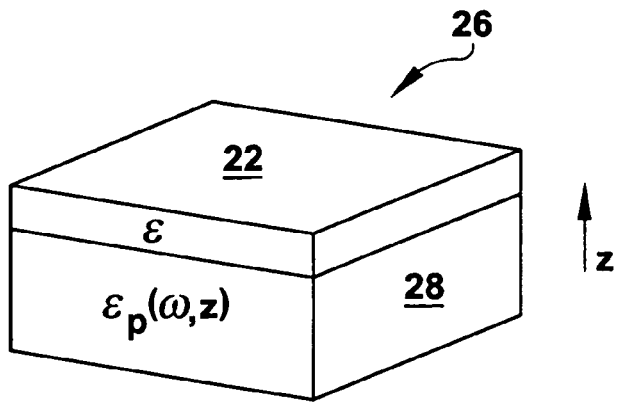
FIG. 1D is a schematic view of a further example Surface-PlasmonoDielectric-Polaritonic system (SPDP) provided by the invention, including a homogenous dielectric region adjacent to an inhomogeneous, continuous plasmonic material region, configured for implementing a selected dispersion relation.

Alternatively, as shown in FIG. 1D, in a further SPDP system 26 of the invention, the plasmonic material region 28 can be provided as an inhomogeneous plasmonic material distribution that is characterized by a plasmonic-material permittivity, $\epsilon_p(\omega,z)$, that varies through the plasmonic material region as a function of position, z, through the thickness of the plasmonic material region. Here a continuous or discontinuous permittivity function, $\epsilon_p(\omega,z)<0$, is implemented by an arrangement of distinct materials, e.g., a stack of distinct layers, or by a single continuous material layer in which material properties change through the thickness of the material layer. The stacked plasmonic material layer arrangement of FIG. 1C is therefore one particular example in which a plasmonic-material permittivity distribution through the thickness of the plasmonic material region is implemented with distinct material layers.

Figure 1E:
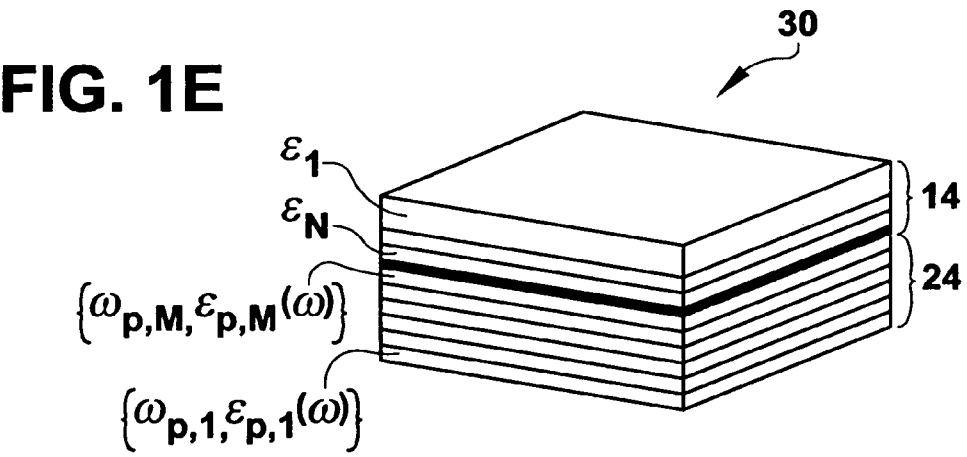
FIG. 1E is a schematic view of a further example Surface-PlasmonoDielectric-Polaritonic system (SPDP) provided by the invention, including a layered dielectric region adjacent to a layered plasmonic material region, configured for implementing a selected dispersion relation.

Referring to FIG. 1E, there is arranged in a further example SPDP system 30 provided by the invention a layered dielectric material region 14 adjacent to a layered plasmonic material region 24. As in the configuration of FIG. 1A above, the dielectric material region here includes a number, N, of dielectric material layers, each layer being characterized by a selected permittivity, $\epsilon_{i=1\ to\ N}$, and having a selected layer thickness, $d_{i=1\ to\ N}$. The layered plasmonic material region 24 includes a number, M, of plasmonic material layers, each layer being characterized by a selected plasmonic-material permittivity, $\epsilon_{pj}(\omega)_{,j=1\ to\ M}$ and having a selected layer thickness, $d_{j=1\ to\ M}$. If the selected plasmonic-material permittivity can be approximated by the Drude model, then it can be described by a selected high-frequency permittivity, $\epsilon_{\infty,j=1\ to\ M}$ and bulk plasma frequency, $\omega_{p,j=1\ to\ M}$. This arrangement of layers enables engineering of the high-frequency cutoff, $\omega_{c,ij}$, of the SPDP system as $\omega_{c,ij}=\omega_{p,j}/\sqrt{\epsilon_{\infty,j}+\epsilon_i}$ based on the selected characteristics of the dielectric and plasmonic layers. The thicknesses and material properties of each layer can be distinct or common with one or more other layers in the stack in the manner given above.

Figure 1F:
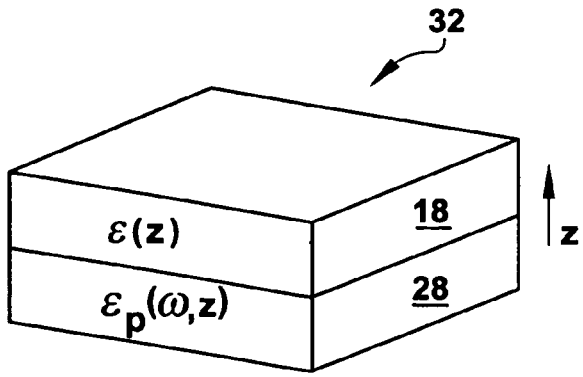
FIG. 1F is a schematic view of a further example Surface-PlasmonoDielectric-Polaritonic system (SPDP) provided by the invention, including an inhomogeneous, continuous dielectric region adjacent to an inhomogeneous, continuous plasmonic material region, configured for implementing a selected dispersion relation.

As shown in FIG. 1F, in a further example SPDP system 32 in accordance with the invention, an inhomogeneous dielectric material region 18 is arranged adjacent to an inhomogeneous plasmonic material region 28. Here the dielectric material region is characterized by a permittivity, $\epsilon(z)$, that varies as a function of position, z, through the thickness of the dielectric material region, and the plasmonic material region is characterized by a plasmonic-material permittivity, $\epsilon_p(\omega,z)$, that varies through the plasmonic material region as a function of position, z, through the thickness of the plasmonic material region.

With these example SPDP arrangements provided by the invention, as well as other configurations described in detail below, the dispersion relation of the SPDP system is tailored in accordance with the invention to provide a prespecified waveguiding characteristic. Example dispersion relations and methodology for implementing such relations are described in detail below. From these examples it is shown that one or both of the dielectric material region and the plasmonic material region can be provided with a corresponding permittivity distribution that varies through the thickness of the region. This permittivity distribution can be continuous or discontinuous, and can be provided as changes through a single material layer or as layers of distinct materials.

To understand the dispersion relation properties of a SPDP system of the invention like those of FIG. 1, first consider a plasmonic material substrate of infinite extent and a dielectric material region provided on the plasmonic substrate in a conventional arrangement. Now in accordance with the invention, between the plasmonic substrate, of permittivity $\epsilon_p$, and the dielectric material region, of permittivity $\epsilon$, there is provided a planar dielectric layer of permittivity $\epsilon_1>\epsilon$ and thickness $d_1$. With this new arrangement, it is found that for small wavevectors, k, the SPDP mode extends deep into the $\epsilon$-dielectric region and is not significantly influenced by the $\epsilon_1$-dielectric layer, and therefore, the mode asymptotes to a SPP on the $E_p$-$\epsilon$ interface. For large k, the SPDP mode is tightly confined on the $\epsilon_p$-$\epsilon_1$ interface, and therefore asymptotes to a SPP on that interface. For a thin enough layer, i.e., small $d_1$, because both of these SPPs have positive group velocity and because for $\epsilon_1>\epsilon$ then the high-frequency cutoffs are related by $\omega_c(\epsilon_1)<\omega_c(\epsilon)$, the limiting k-regions must be connected through a regime of negative group velocity, with two boundaries of zero group velocity (zgv), one with negative curvature at a small $k_{n,1}$ and one with positive curvature at a large $k_{p,1}>k_{n,1}$. Note that these boundaries are circles in the 2-d k-plane, projected as points in $\omega$-k plots, and that surface-polaritonic systems are the only systems known in nature with 2-d continuous translational symmetry that exhibit such zgv points at a non-zero wavevector.

Now extending this configuration to the arrangement of FIG. 1A, in one example, in accordance with the invention there is inserted between the plasmonic material substrate and the $\epsilon_1$-dielectric layer another planar dielectric layer of permittivity $\epsilon_2<\epsilon_1$ and thickness $d_2<d_1$. With this arrangement of three dielectric layers, for small k, the SPDP behavior does not change, but, for large k, the SPDP mode must now asymptote to a SPP on a $\epsilon_p$-$\epsilon_2$ interface; since for $E_2<\epsilon_1$ it follows that $\omega_c(\epsilon_2)>\omega_c(\epsilon_1)$, the large-$k_{p,1}$ zgv point moves to a smaller wavevector $k_{p,2}<k_{p,1}$ and two zgv points remain at $\sim k_{n,1}$ and $k_{p,2}$, provided $d_2$ is small enough that $k_{n,1}<k_{p,2}$.

This analysis demonstrates that as dielectric layers are added to the structure to form a SPDP system like that of FIG. 1A, with the thickness and permittivity of dielectric layers being specifically selected, zgv points can be introduced in the dispersion relation of the SPDP system at correspondingly selected wavevectors. To achieve such zgv points, the thicknesses of the layers can be set to diminish from top to bottom or alternatively, from bottom to top of the dielectric region, or in no particular pattern, for any number of layers, and no specific relation between permittivities of adjacent layers is required. As in the analysis given above, the process of inserting additional dielectric layers, e.g., of smaller and smaller thicknesses $\{d_i\}$, with varying permittivities $\{\epsilon_i\}$, adjacent to a plasmonic material region can be continued substantially arbitrarily.

For the example in which the dielectric layers are made progressively thinner from top to bottom of the dielectric layer stack, the general rule for the resulting SPDP modal dispersion relation, upon insertion of the $i^{th}$ layer of dielectric, is that $\omega(k\rightarrow\infty)=\omega_c(\epsilon_i)$. For adequately small layer thicknesses, where $d_i<d_{i-1}$, the following conditions are produced based on the permittivities of adjacent dielectric layer arrangements: Where $\epsilon_i<\epsilon_{i-1}<\epsilon_{i-2}$, no new zgv point is created. Where $\epsilon_i<\epsilon_{i-1}>\epsilon_{i-2}$ no new zgv point is created and the large-$k_{p,i-1}$ zgv point moves to $k_{p,i}$, where $k_{n,i-1}<k_{p,i}<k_{p,i-1}$. Where $\epsilon_i>\epsilon_{i-1}>\epsilon_{i-2}$, two new zgv points at $k_{n,i}$ and $k_{p,i}>k_{n,i}$ are created. Where $\epsilon_i>\epsilon_{i-1}>\epsilon_{i-2}$, either two new zgv points are created at $k_{n,i}>k_{p,i-1}$ and $k_{p,i}>k_{n,i}$, if $d_i$ is very small, or no new zgv point is created and the large-$k_{p,i-1}$ zgv point moves to another large wavevector, $k_{p,i}$, if $d_i$ is only slightly smaller than $d_{i-1}$.

With these rules, the dielectric layers of the structure of FIG. 1A can be specified to create a selected dispersion relation with one or more zgv points at selected wave vectors. The sole restriction as to what dispersion relation can be implemented is imposed by the general nature of plasmonic systems, requiring that the maximum attainable magnitude of the group velocity, $|v_g|$, must decrease rapidly as the wavevector, k, increases, with an apparent scaling of max $|v_g| \sim 1/k$. As stated above, the enabling key for dispersion manipulation is that, upon insertion of the $i^{th}$ layer of dielectric material, the condition of $\omega(k \rightarrow \infty) = \omega_c(\epsilon_i)$ is always met.

In one particular embodiment of this methodology provided by the invention, the dielectric material region of an SPDP system of the invention is specified to tailor the dispersion relation for exceptionally-high-order cancellation of group-velocity dispersion for a slow subwavelength light mode. In one example, the SPDP system 10 of FIG. 1A can be employed for this implementation. Given a small group velocity, $v_{go}$, so that $v_g - v_{go}$ has several roots, depending on the chosen $v_{go}$, then by modifying the layers of the dielectric region 14 in the SPDP system 10 so as to increase (decrease) the thicknesses of the bottom (top) layers, the roots of $v_g - v_{go}$ at large (small) wavevectors move to smaller (larger) wavevectors, and, with the appropriate choice of the thicknesses $\{d_i\}$, a number, N, of these roots can be forced to coincide at the same wavevector of intermediate value $k_o$ and at frequency $\omega_o$. With this root of multiplicity N, dispersion is substantially suppressed up to Nth order for the SPDP mode. Locally the SPDP dispersion relation is then given as:

$$k - k_o = v_{go}^{-1}(\omega - \omega_o) + \frac{c^{-1}\omega_o^{-N}}{(N+1)!} D_{k,N+1}(\omega - \omega_o)^{N+1} \quad (1)$$

or equivalently as:

$$\omega - \omega_o = v_{go}(k - k_o) + \frac{c^{N+1}\omega_o^{-N}}{(N+1)!} D_{\omega,N+1}(k - k_o)^{N+1}, \quad (2)$$

where $$D_{k,n} \equiv \omega_o^{n-1} \frac{\partial^{n-1}}{\partial \omega^{n-1}}\left(\frac{\partial ck(\omega_o)}{\partial \omega}\right),$$

$$D_{\omega,n} \equiv \omega_o^{n-1} \frac{\partial^{n-1}}{\partial (ck)^{n-1}}\left(\frac{\partial \omega(k_o)}{\partial ck}\right)$$

are the normalized dimensionless dispersion constants of $n^{th}$ order, and, when all are zero up to $N^{th}$ order as in Expressions (1) and (2), then $D_{\omega,N+1} = -(v_{go}/c)^{N+2}$. This analysis demonstrates that the SPDP systems of the invention enable, for small positive, negative, or zero group velocity, the substantial suppression of dispersion to very high orders. The term "suppression of dispersion" is herein meant to refer to the ability of the SPDP systems of the invention to suppress group velocity dispersion by at least about one order of magnitude over the suppression that would be characteristic for a homogenous dielectric region adjacent to a homogenous plasmonic material region.

Turning to the specific design methodology provided by the invention for implementing a SPDP system with a selected dispersion relation, such as dispersion suppression to high orders as just described, in a first example, a general SPDP system configuration is defined to provide a region of plasmonic material and, adjacent to the plasmonic material, a plurality of layers of dielectric materials that form a dielectric region as in FIG. 1A. The plasmonic material is characterized by a dielectric permittivity $\epsilon_p(\omega)$. If the selected permittivity can be approximated by the Drude model, then it can be described by a plasma frequency, $\omega_p$, and a high-frequency dielectric permittivity, $\omega_\infty$. The dielectric layers are each provided with a thickness, $d_i$, and are each characterized by a permittivity, $\epsilon_i$, where $i=1$ to N for the N layers of dielectric materials provided in the dielectric region.

The plasmonic material can be specified and provided as any material system that can be characterized by a material dispersion relation which resembles that of a plasma material within a frequency regime of interest. Therefore, the plasmonic material can be modeled and provided as a metallic material, e.g., for applications at optical and infrared frequencies, can be provided as a doped semiconducting material, e.g., for applications in THz frequencies, and can be provided as metallodielectric material, or other suitable material. For example, the plasmonic material can be provided as a periodic crystal of a combination of materials, such as a metallodielectric photonic crystal, or in any other selected arrangement that provides a plasma dispersion relation at frequencies selected for SPDP operation.

A periodic structure, e.g., composed of metallic and/or doped semiconducting materials and dielectric materials, can provide an effective homogeneous plasmonic material when the structure is ordered with a periodicity that is much smaller than the wavelength of operation, e.g., for applications in microwave frequencies. For this subwavelength periodic structure, the crystal effectively operates as a plasmonic medium as the dielectric and magnetic properties resemble those of a plasma medium. With this example, it is in general to be understood that so long as a material or a collection and configuration of materials has effective properties similar to a plasma medium and meets the condition of $\epsilon_p(\omega) < -\epsilon_{i=1\ to\ N} < 0$ at the frequency of interest for the SPDP system, the material or collection/configuration of materials can be employed for the plasmonic region of the SPDP structure.

With the SPDP structure thusly defined as in FIG. 1A, the dispersion relation $F(\omega, k, \omega_p, \epsilon_\infty, d_i, \epsilon_i) = 0$ of the structure is determined using a convenient method and tool, e.g., analytical or numerical methods and computation by, e.g., a selected modeling program. The group velocity, $v_g(\omega, k, \omega_p, \epsilon_\infty, d_i, \epsilon_i)$, that is supported by the structure is then set as known as a function of frequency, $\omega$, wavevector, k, and the geometric and material parameters of the structure, using a selected analytical or numerical method. At this point, the characteristics of the dispersion relation are then tailored as-desired for a given application.

For example, if a surface polaritonic mode is desired with group velocity $v_{go}$ and $N^{th}$ order group-velocity-dispersion (gvd) cancellation at the frequency $\omega_o$ and wavevector $k_o$, then an $N^{th}$ multiplicity root is forced at the frequency $\omega_o$ and wavevector $k_o$ for the function $G(\omega, k, \omega_p, \epsilon_\infty, d_i, \epsilon_i, v_{go}) = v_g(\omega, k, \omega_p, \epsilon_\infty, d_i, \epsilon_i) - v_{go}$. In practice, for design purposes, one needs to force N roots on G very close to $\omega_o, k_o$, to the desired precision. Starting then with a plasmonic material of appropriate plasma frequency, $\omega_p$, above $\omega_o$ and with at least N−2 dielectric material layers, an optimization algorithm is employed to determine the values of the dielectric layer thicknesses, $d_i$, and the permittivities, $\epsilon_i$, that force G to zero at N values of $\omega$, k, around $\omega_o, k_o$. Depending on the number of selected dielectric layers, more than one solution may be possible. Furthermore, if the wavevector, $k_o$, does not need to be specified, only the thicknesses, $d_i$, or only the permittivities, $\epsilon_i$, need to be determined as unknown variables and the other parameters can remain fixed. This gvd cancellation can be characterized as suppression of gvd by at least an order of magnitude over the gvd characteristic of a homogeneous dielectric material region adjacent to a plasmonic material region.

In practice, because the roots of the $v_g-v_{go}$ function are the essential tool of the dispersion cancellation mechanism, an oscillatory behavior of this function is needed. The choice of materials for the dielectric layers are therefore for this implementation preferred to alternate as higher-index and lower-index layer materials, because each such pair of consecutive layers generates an additional oscillation with two zgv points and two roots of $v_g-v_{go}$ at controllable $\omega$- and k-values. With this design, a minimal number of $\approx N$ layers are then needed for creating N roots of $v_g-v_{go}$, and their N-fold coincidence can be accomplished at the desired frequency $\omega_o$ and sub-wavelength wavevector $k_o$ by choosing and/or fine-tuning the parameters $\{\omega_p, \epsilon_\infty, \epsilon_i, d_i\}$. In principle, one can keep adding pairs of layers to increase N as-needed.

The number, N, of order of dispersion cancellation that can ultimately be supported by the SPDP structure depends on how rapid a change in group velocity within the dispersion curve is physically accommodated by the plasmonic material region. In accordance with the invention it is here specified that a larger number N, is to be supported as $|v_{go}|$ is made smaller and $k_o$ increases, because then $v_g-v_{go}$ can have more roots more easily. In practice, the number, N, of order of dispersion cancellation need not be large to achieve a selected dispersion relation, as demonstrated by the examples discussed in detail below. For gvd suppression up to order N, a plurality of at least about N–2 separate layers can be employed for many applications.

Aside from this dispersion cancellation example, more generally, if a surface polaritonic mode is desired with group velocities $v_{gn}$ at the N frequencies $\omega_n$ and wavevectors $k_n$ respectively, then simultaneous roots need to be forced for the N functions $G_n(\omega_n, k_n, \omega_p, \epsilon_\infty, d_i, \epsilon_i, v_{gn}) = v_g(\omega_n, k_n, \omega_p, \epsilon_\infty, d_i, \epsilon_i) - v_{gn}$. Starting then with a plasmonic material of appropriate plasma frequency $\omega_p$ above the $\omega_n$'s and with at least N–2 layers of dielectric materials, an optimization algorithm is employed to determine the values of the dielectric layer thicknesses, $d_i$, and the permittivities, $\epsilon_i$, that force all of the $G_n$ functions to zero simultaneously. As in the case above, depending on the number of dielectric layers selected, more than one solution may be possible, and, if the wavevectors $k_n$ do not need to be specified, then only the thicknesses, $d_i$, or only the permittivities, $\epsilon_i$, need to be determined as unknown variables and the other parameters can remain fixed.

Furthermore, if a surface polaritonic mode is desired with frequencies $\omega_n$ at the N wavevectors $k_n$ respectively, then simultaneous roots need to be forced for the N functions $F_n(\omega_n, k_n, \omega_p, \epsilon_\infty, d_i, \epsilon_i)$. Starting then with a plasmonic material of appropriate plasma frequency $\omega_p$ above the $\omega_n$'s and with at least N–1 layers of dielectric materials, an optimization algorithm is employed to determine the values of the dielectric layer thicknesses, $d_i$, and the permittivities, $\epsilon_i$, that force all of the $F_n$ functions to zero simultaneously. As in the cases above, depending on the number of dielectric layers selected, more than one solution may be possible.

In the design of a SPDP system like that of FIG. 1C, in which a homogeneous dielectric material region 22 is provided adjacent to a layered plasmonic region 24, the plasmonic materials are each characterized by a thickness $d_j$, and plasmonic-material permittivity, $\epsilon_{pj}(\omega)_{,j=1\ to\ M}$, where $j=1$ to M plasmonic material layers, and the dielectric material is characterized by a homogenous permittivity, $\epsilon$. If the plasmonic-material permittivities can be approximated by the Drude model, then they can be described by high-frequency plasmonic-material permittivities, $\epsilon_{\infty, j=1\ to\ M}$, and bulk plasma frequencies, $\omega_{p,j=1\ to\ M}$.

As in the multi-layer dielectric structure design just given, here the dispersion relation $F(\omega, k, \omega_{pj}, \epsilon_{\infty j}, d_j, \epsilon) = 0$ of the structure is determined computationally or analytically, and the group velocity is given as $v_g(\omega, k, \omega_{pj}, \epsilon_{\infty j}, d_j, \epsilon)$ as a function of frequency, $\omega$, wavevector, k and the geometric and material parameters above, using a selected method.

Then, for example, if a surface polaritonic mode is desired with group velocity $v_{go}$ and $M^{th}$ order group-velocity-dispersion (GVD) cancellation at the frequency $\omega_o$ and wavevector $k_o$, an $M^{th}$ multiplicity root is set at the frequency $\omega_o$ and wavevector $k_o$ for the function $G(\omega, k, \omega_{pj}, \epsilon_{\infty j}, d_j, \epsilon, v_{go}) = v_g(\omega, k, \omega_{pj}, \epsilon_{\infty j}, d_j, \epsilon) - v_{go}$. As in the example above, here in practice the M roots are forced on G very close to $\omega_o, k_o$, to the desired precision. Starting then with at least M–2 plasmonic layers, an optimization algorithm is employed to determine the values of the thicknesses $d_j$, the plasma frequencies $\omega_{p,j}$, which typically are all be above $\omega_o$, and the permittivities $\epsilon_{\infty j}$ that set the function G at zero at M values of $\omega$, k around $\omega_o$, $k_o$. Depending on the number of chosen plasmonic layers, more than one solution may be possible and as stated above, if the wavevector $k_o$ does not need to be specified, only the thicknesses $d_j$ or only the plasmonic material parameters may need to be determined as unknown variables. For gvd suppression up to order M, a plurality of at least about M–2 separate layers can be employed for many applications.

More generally, if a surface polaritonic mode is desired with group velocities $v_{gm}$ at the M frequencies $\omega_m$, and wavevectors $k_m$, respectively, then simultaneous roots need to be forced for the M functions $G_m(\omega_m, k_m, \omega_{pj}, \epsilon_{\infty j}, d_j, \epsilon, v_{gm}) = v_g(\omega_m, k_m, \omega_{pj}, \epsilon_{\infty j}, d_j, \epsilon) - v_{gm}$. Starting then typically with at least M–2 layers, one can use an optimization algorithm to determine the values of the thicknesses, $d_j$, the plasma frequencies, $\omega_{pj}$ (typically all above the $\omega_m$'s), and the permittivities, $\epsilon_{\infty j}$, that make all the $G_m$'s zero simultaneously. Depending on the number of chosen layers, more than one solution may be possible. Furthermore, if the wavevectors $k_m$ do not need to be specified, then only the thicknesses $d_j$ or only the material parameters need to be determined as unknown variables with the other variables fixed.

Furthermore, if a surface polaritonic mode is desired with frequencies $\omega_m$ at the M wavevectors $k_m$, respectively, then simultaneous roots need to be forced for the M functions $F_m(\omega_m, k_m, \omega_{pj}, \epsilon_{\infty j}, d_j, \epsilon)$. Starting then typically with at least M–1 layers, one can use an optimization algorithm to determine the values of the thicknesses, $d_j$, the plasma frequencies, $\omega_{pj}$ (typically all above the $\omega_m$'s), and the permittivities, $\epsilon_{\infty j}$, that make all the $F_m$'s zero simultaneously. Depending on the number of chosen layers, more than one solution may be possible.

In accordance with the invention, the design methodology given above can be extended to the design of linear SPDP waveguides. Any of the material arrangements of FIGS. 1A-1F can be provided in a waveguide configuration. For example, referring to FIG. 2, the SPDP arrangement of FIG. 1A can be applied to a dielectric waveguide structure 35 in which there is provided a plasmonic substrate 36 underlying a layered dielectric structure 38. The dielectric structure 38, on top of the plasmonic substrate, is axially uniform in a waveguiding direction but has a finite width, w, in the transverse direction. The dielectric structure is surrounded by a homogeneous dielectric of permittivity $\epsilon_c$, as shown in FIG. 2.

Figure 2:
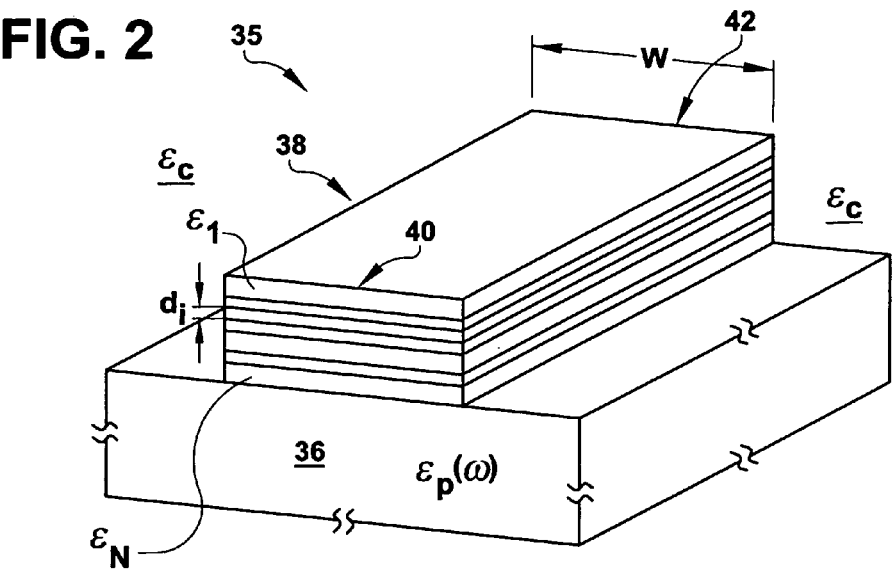
FIG. 2 is a schematic view of an example SPDP waveguide provided by the invention, including a homogenous plasmonic material substrate on which is provided a layered dielectric waveguide, configured for implementing a selected dispersion relation.

The waveguide structure of FIG. 2 is illustrated out of proportion for clarity; it is to be recognized that the substrate extends beyond the waveguide structure. The structure is shown without input or output couplers to the waveguide, also for clarity; it is to be recognized that the waveguide structure includes an input port 40 and an output port 42.

Multiple guided modes exist for this waveguide structure so long as the dispersion curve of the corresponding theoretical structure, of infinite width, lies in the ω–k plane to the right of a SPP on a $\epsilon_p$–$\epsilon_c$ interface. This condition can be satisfied for a wide range of surrounding permittivities, $\epsilon_c$, including at least $\epsilon_c \leq \min\{\epsilon_i, \epsilon\}$ and $\epsilon_c \geq \max\{\epsilon_i, \epsilon\}$, e.g., for $\epsilon_c = \epsilon = 1$. Then, denoting as β the conserved wavevector along the one-dimensional (1-d) translationally-invariant guiding direction, the methodology given above for fine-tuning the parameter set of $\{\omega_p, \epsilon_\infty, \epsilon_i, \epsilon_c, \epsilon, d_i\}$ is employed for a selected application, e.g., for suppressing dispersion to the $N^{th}$ order of the system. This is implemented on the ω–β dispersion of the first few guided SPDP modes, and usually the very first mode in practice, whose dispersion digresses little from that of the corresponding theoretical infinite-width structure. As in the methodology described above, this dispersion engineering can account for weak material dispersion of the dielectric material layers, and considerations like those given above hold for the range of the simultaneously achievable $\omega_o$, $\beta_0$, $v_{go}$ and N.

As stated above, the example waveguide structure of FIG. 2 can be configured with any of the material layer arrangements of FIGS. 1A-1F. The plasmonic material substrate can be layered instead of, or in addition to, the dielectric material waveguide. Either or both the dielectric and plasmonic material regions of the waveguide can also be provided as continuous distributions of material properties or as discrete layers for implementing a permittivity distribution through the thickness of the material region. For any of these arrangements, the methodologies given above are applied to impose a selected dispersion relation on the waveguide structure.

Figure 3A:
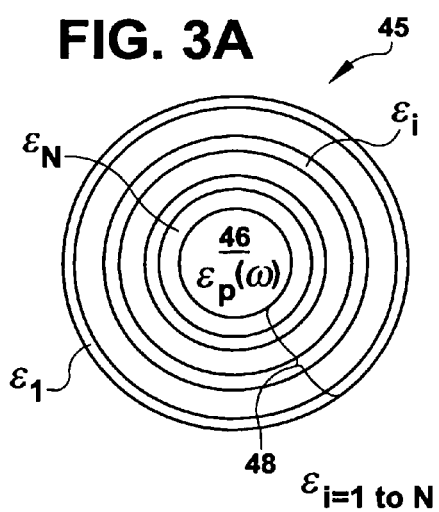
FIG. 3A is a schematic end view of an example SPDP fiber-structure provided by invention, including a plasmonic material core around which is provided a layered dielectric region, configured for implementing a selected dispersion relation.
Figure 3B:
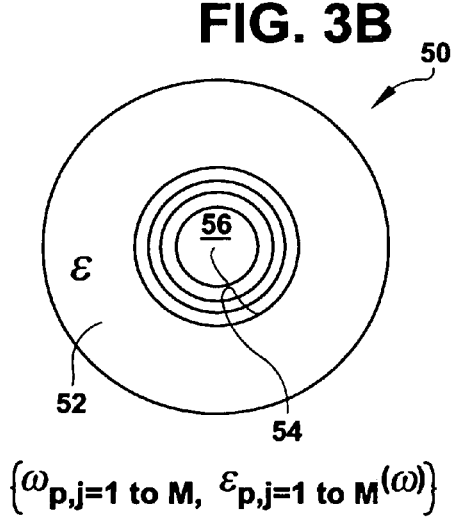
FIG. 3B is a schematic end view of an example SPDP fiber-structure provided by invention, including a dielectric material core around which is provided a layered plasmonic material region, configured for implementing a selected dispersion relation.

Referring now also to FIGS. 3A-3B, the planar SPDP waveguide of FIG. 2, and indeed, all of the SPDP waveguiding configurations of FIG. 1 can be implemented in non-planar arrangements, and the SPDP structure and dispersion engineering methodology of the invention are not limited to planar structures. For example, as shown in FIG. 3A, there can be implemented a nonplanar waveguide that is implemented with a cylindrical fiber-like SPDP geometry having a plasmonic material core region 46 and layers of dielectric materials 48 provided circumferentially around the core 46. The dielectric material layers 48 can be provided in the manner of FIGS. 1A and 1E, with N dielectric layers having selected permittivities and thicknesses across the N layers.

Similarly, as shown in FIG. 3B, the SPDP structure can be provided as a generally fiber-like geometry having a homogeneous outer region 52 of a selected dielectric material, with a central plasmonic region 54 including a number, M, of plasmonic material layers, each with a selected plasmonic-material permittivity and thickness. The fiber core 56 is provided as a plasmonic material or other selected fiber material. With the fiber-like implementations of FIGS. 3A-3B, it is demonstrated that the SPDP structure of the invention can be provided in any convenient geometry that accommodates a layered structure. Indeed any of the SPDP arrangements of FIGS. 1A-1F can be configured in a fiber geometry or other waveguiding configuration for a selected application. All that is required by the invention is that some region of the structure provides adjacent plasmonic and dielectric material regions that can be engineered to achieve a selected dispersion relation for the structure.

It is recognized in accordance with the invention that for the SPDP structures described above, material losses need to be considered for a range of applications. In general, all materials exhibit intrinsic absorption losses, which are usually quantified as loss-per-unit-distance, α, also called a propagation loss, or loss-per-unit-time, Γ, related to the quality factor, Q, given as Q=ω/2Γ. The dispersion relation F($\bar{\omega}$, $\bar{k}$)=0 as given above is analytic with respect to the generally complex frequency including loss, $\bar{\omega}$, given as $\bar{\omega}=\omega-i\Gamma$, and wavevector including loss, $\bar{k}$, given as $\bar{k}=k+i\alpha$, so the Cauchy-Riemann equation $$\frac{\partial \text{Im}\bar{k}}{\partial \text{Im}\bar{\omega}} = \frac{\partial \text{Re}\bar{k}}{\partial \text{Re}\bar{\omega}} = 1/v_g$$

suggests that, for small loss, the two loss-rates relate by $$\alpha \approx \frac{\partial \text{Im}\bar{k}}{\partial \text{Im}\bar{\omega}} \cdot \Gamma,$$

so that $\alpha v_g \approx \Gamma$.

Therefore, it is found that propagation loss, α, is not a good measure of loss in regimes close to zgv points, where 'propagation' lacks physical meaning and $\alpha \sim 1/v_g \to \infty$; a measure of loss-per-unit time, Γ, is here more appropriate. The loss-measure of gvd evolution, i.e., the Re$\bar{\omega}$–Re$\bar{k}$ relation, and the techniques for its manipulation remain unaffected in the presence of weak material absorption, its basic effect being just field attenuation. This holds for the SPDP structures of the invention and the dispersion relation engineering of the invention.

In the subwavelength, high-k, regime that can be of interest for many applications for dispersion suppression to high orders, the dispersion relation of a SPDP structure depends on $\bar{\omega}$ only through $\bar{\epsilon}_p(\bar{\omega})$, namely F($\bar{\omega}$,$\bar{k}$)=F($\bar{\epsilon}_p(\bar{\omega})$,$\bar{k}$)=0. Without loss, F($\epsilon_p(\omega)$,k)=0. With loss added only to the plasmonic material, for small $\gamma/\omega_p$ in the Drude form $\bar{\epsilon}_p(\bar{\omega}) \approx \epsilon_p(\bar{\omega}+i\gamma/2)$. Therefore, to determine solutions with a real k, the expression is set as F($\bar{\epsilon}_p(\bar{\omega})$,k)=F($\epsilon_p(\bar{\omega}+i\gamma/2)$,k)=0. It is found that compared with the lossless case, the pair ($\bar{\omega}=\omega-i\gamma/2$,k) is a solution of the lossy case. This implies that $\alpha v_g \approx \Gamma \approx \gamma/2$, namely a constant, independent of frequency and wavevector.

The fact that this is independent of frequency and wavevector indicates that, at the frequency and wavevector points $\omega_o$, $k_o$, at which group velocity has been cancelled to $N^{th}$ order ($D_{k,n}=0$ for n=2 ... N), attenuation dispersion has also been cancelled to $(N-1)^{th}$ order [

$$\left[ D_{\alpha,n} \equiv \omega_o^n \frac{\partial^n}{\partial \omega^n}\left(\frac{c\alpha(\omega_o)}{\omega_p}\right) = \right.$$
$$\left. \omega_o^n \frac{\partial^n}{\partial \omega^n}\left(\frac{\partial ck(\omega_o)}{\partial \omega}\right) \cdot \gamma/2\omega_p = D_{k,n+1} \cdot \gamma/2\omega_p = 0 \text{ for } n = 1 \ldots N-1 \right]$$

and thus the propagation loss, α, can be expressed as:

$$\alpha = \alpha_o + \frac{c^{-1}\omega_o^{-N}\omega_p}{N!} D_{\alpha,N}(\omega-\omega_o)^N. \tag{3}$$

It is important to note that the surface-polaritonic modes of the SPDP structures of the invention exist inherently only for the TM polarization. As a result, the modes do not suffer from polarization mode dispersion. Thus, the SPDP structures of the invention can be configured to operate substantially with no group velocity dispersion, no attenuation dispersion, and no polarization mode dispersion. Such dispersion-free light guiding enables the SPDP structures of the invention to address a wide range of applications with unprecedented performance.

But it is recognized that loss mechanisms, such as absorption and scattering, can impact the SPDP performance. It was shown just above that attenuation dispersion induced by plasmonic-material-type absorption losses can be cancelled. However, for metals in the optical frequency regime and at room temperatures, the ratio $\gamma/\omega_p \approx 10^{-2}$, so the attenuation rate itself is strong, whereby $Q \approx 100 \, \omega/\omega_p$ in time, or $\alpha \approx 10 \log_{10}(c/v_g*n/100) \, dB/\lambda_p$
in space. This propagation loss increases prohibitively with wavevector, because min $|\alpha| \approx (\gamma/2)/\max|v_g|\sim k$, as given previously. In accordance with the invention, these intrinsic losses may be reduced by lowering the temperature of the SPDP structure during operation.

A cause for scattering losses, which are proportional to $\sim 1/v_g$, and a cause for spurious reflections, which are proportional to $\sim 1/v_g^2$, is geometrical imperfections and disorder in the SPDP structure. Such imperfections are in general unavoidable and are dictated by microfabrication tolerances. A range of modern material layer deposition processes, such as atomic layer deposition (ALD) molecular beam epitaxy (MBE) and nanometer-scale lithographic techniques, such as deep ultraviolet immersion lithography, are promising for manufacturing high-quality mass-producible SPDP structures in accordance with the invention. It is preferred in accordance with the invention that the microfabrication techniques employed in manufacture of an SPDP system of the invention provide a manufacturing tolerance that meets the requirements of a given photonic application.

Note, however, that SPDP devices intended for supporting slow light are small in size relative to other SPDP devices and the overall loss of smaller devices can be tolerable for many applications. Furthermore, absorption losses are typically expected to be the dominant loss effect over scattering losses during subwavelength operation.

A further cause of loss to be considered for an SPDP system of the invention is the coupling of light into the structure. Even under the assumption of perfect materials and geometry, losses due to coupling of light into a broadband, slow, and subwavelength SPDP system are finite, because any conventional microfabrication material is in general highly k-mismatched with the SPDP structure. In accordance with the invention, such mismatch is addressed for positive-group-velocity slow SPDP structures by providing the layered dielectric region with adiabatically changing dimensions, so as to achieve dispersion cancellation at a fixed frequency at points along the layers, while adiabatically increasing the group velocity that is supported by the layers, until the parameters are similar to that of a coupling medium. Similarly, for negative-group-velocity SPDP structures of the invention, adiabatic transitions in time can be employed to meet that of a coupling medium.

In addition, SPDP devices of the invention can be implemented for lower frequency regimes also by exploiting Surface-AtomDielectric-Polaritons, ExcitonDielectric-Polaritons, or PhononDielectric-Polaritons on interfaces between dielectrics and materials with permittivities such as $\bar{\epsilon}_p(\omega) = \epsilon_\infty - \omega_p^2/(\omega^2 - \omega_o^2 + i\gamma\omega)$, where $\omega_o$ is the atomic, excitonic or phononic resonance frequency. In this case, some of the above problems are mitigated, because these polaritonic materials usually exhibit smaller intrinsic losses, i.e., smaller $\gamma/\omega_p$, and at lower frequencies very thin layers having relatively small surface disorder can be implemented with microfabrication. Again, a periodic structure of appropriate materials ordered with subwavelength periodicity can provide an effective homogeneous polaritonic material. It is in general to be understood that so long as a material or a collection and configuration of materials has effective properties similar to a polaritonic medium and meets the condition of $\epsilon_p(\omega) < -\epsilon_{i=1 \, to \, N} < 0$ at the frequency of interest for the Surface-Polaritonic system, it can be employed for the negative-permittivity region of the Surface-Polaritonic structure.

With these considerations, the SPDP systems of the invention can be designed to support selected optical propagation, e.g., slow and subwavelength propagation of short pulses, that do not suffer phase or amplitude distortion as they are guided through the SPDP system. This enables application of the SPDP systems of the invention to the implementation of compact and efficient optical delay lines, for use, e.g., in optical telecommunications and computing as well as other applications described below.

Considering first delay lines, the common figure-of-merit for the characterization of optical delay lines is the so-called 'bandwidth-delay product,' which has been shown to be fundamentally limited by dispersion. After propagation on a line of length L that is characterized by only group velocity dispersion as in Expression (1) above, Gaussian bit-pulses of an initial width, i.e., standard deviation, of $T_p(0)$, consisting of not-too-few ($\gg D_{k,N+2}/D_{k,N+1}$) optical cycles so that the $(N+2)^{th}$-order dispersion can be ignored, are broadened to a width expressed as:

$$T_P^2(L) = T_P^2(0) \cdot \left[1 + \left[\frac{D_{k,N+1}(\omega_o L/c)}{(\omega_o T_P(0))^{N+1}} s_{N+1}\right]^2\right], \quad (4)$$

where $$s_{N+1} = \sqrt{(2N-1)!!/(N!)^2 - \mathrm{mod}(N+1,2)/(N!!)^2} \Big/ 2^N.$$

Thus for a bit rate, B, given as $B=1/T_B$, the optimal $T_p(0)$ and the maximum L for distortionless ($T_p(L)/T_B \leq 1/4$) propagation is given as:

$$\frac{T_P(0)}{T_B} = \frac{1}{4}\sqrt{\frac{N}{N+1}} \quad (5)$$

and and (6)

$$L/\lambda_o = \frac{S_{N+1}(\omega_o T_B)^{N+1}}{2\pi|D_{k,N+1}|},$$

where $S_{N+1} = \sqrt{N^N/(N+1)^{N+1}} \Big/ s_{N+1} \Big/ 2^{2N+2}.$

The figure-of-merit, expressed as the number, U, of bits that the line can store, can then be expressed as the largest possible product of the bit rate, B, times the distortionless time delay, $\tau$, where $\tau = L/|v_{go}|$, as:

$$U = \tau/T_B = \frac{S_{N+1}(\omega_o T_B)^N}{|D_{k,N+1}|(|v_{go}|/c)}. \quad (7)$$

Expression (7) makes clear that it can be most preferable to implement a delay line with a large number, N, of order of dispersion suppression. Even the shortest possible pulse has at least one optical-cycle duration, whereby $\omega_o T_P \gtrsim 2\pi$ such that $\omega_o T_B \gtrsim 8\pi$, and for typical broader pulses, corresponding to a smaller bit rate, $\omega_o T_B \gg 1$. As a result, the N-polynomial increase in U is tremendous. Similarly, for a delay line characterized only by attenuation dispersion, as in Expression (3) above, and under the assumption that $D_{\alpha,N}(\omega_p L/c)/(\omega_o T_P(0))^N \ll 1$, the leading-order contribution to pulse-broadening comes for N even (N=2,4,6 . . . ) and can be expressed as:

$$T_P^2(L) = T_P^2(0) \cdot \left[1 + \frac{D_{\alpha,N}(\omega_P L/c)}{(\omega_o T_P(0))^N} s_N'\right], \quad (8)$$

where $$s_N' = [(N-1)!!/(N-1)!]/2^{N-1}.$$

To account for the combination of group velocity dispersion and attenuation dispersion, Expressions (4) and (8) above are added; although it is recognized that simple analytical formulas for L and U cannot in this case be derived.

To analyze the performance of a SPDP delay line in accordance with the invention, it is first noted that because $D_{\alpha,N} = D_{k,N+1} \cdot \gamma/2\omega_p$ and $\gamma/\omega_p \lesssim 10^{-2} \ll 1$, the SPDP delay line is limited by gvd alone for pulses of not-too-many ($\ll \omega_p/\gamma$) optical cycles, and ad can be ignored; Expressions (6) and (7) above then provide safe performance estimates. In one estimate, employing SPDP structures of the examples given below, it is found that for a line length of ~45200 $\lambda_o$, the SPDP delay line can hold ~63200 undistorted bits of 50-optical-cycle pulses, with ~1 Tbps at $\lambda_o$ defined as $\lambda_o \equiv 2\pi c/\omega_o = 1.3$ μm. A SPDP line length of ~27000 $\lambda_o$ can hold ~61700 undistorted bits; and a SPDP line length of ~4700 $\lambda_o$ can hold ~21400 undistorted bits of 50-optical-cycle pulses. This slow-light performance demonstrates that a SPDP delay line of the invention essentially does not suffer from any practical limit on the 'bandwidth-delay product.'

In the limit of zero group velocity, the SPDP system of the invention can support monochromatic stopped subwavelength light, which can be spatially shaped as very tiny light-drops, because the dispersion cancellation technique of the invention allows for the design of a dispersion relation with ultraflat bands and large wavevector bandwidths. Such stopped and confined light can be directly employed in accordance with the invention in ultradense optical buffers and optical memory, for telecommunications, computing, or other application.

Figure 4:
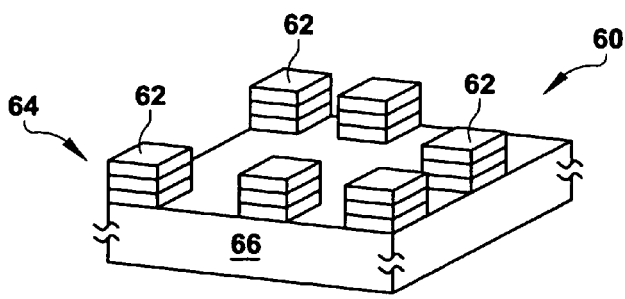
FIG. 4 is a schematic view of an example Surface-PlasmonoDielectric-Polaritonic system (SPDP) provided by the invention, including a homogenous plasmonic material region adjacent to a layered dielectric region, configured for implementing a selected dispersion relation, with the dielectric region partitioned into nanoparticle regions.

For ultradense light confinement in an SPDP system of the invention, a structure with complete translational symmetry, such as the planar or linear SPDP waveguides described above and shown in FIGS. 1-3, is not necessarily needed. Instead, it can be here preferred to implement the SPDP system as SPDP cavities. Referring to FIG. 4, in one example embodiment, an SPDP cavity-based device 60 is produced by spatially truncating a selected region or regions of the SPDP device into one or more highly-subwavelength islands 62. For example the layered dielectric region 64, disposed on a plasmonic substrate 66, can be provided as islands 62 of dielectric layers.

Such nanometer-sized cavity structures 62 can be considered as nanoparticles. These SPDP nanoparticles of the invention can operate with an extremely long radiation lifetime with adjustment of their size to approximately an integer multiple of a half-wavelength, i.e., the inverse of wavevector, for which the non-truncated SPDP waveguide has a zgv point. In fact, the flatter the dispersion band, namely, the larger the order of dispersion cancellation around the zgv point, the higher the related radiation quality factor, Q, is expected to be, because more modes contribute to far-field destructive interference. Given the high-order dispersion cancellation that can be imposed on the SPDP nanoparticles of the invention with the dispersion engineering methodology given above, SPDP nanoparticles can store light that is substantially devoid of radiation loss.

Apart from enabling linear optical-storage devices, such as buffers and memory, slow-light is also known to greatly enhance the performance of nonlinear optical devices, such as electro-optical and all-optical modulators and switches, using, for example, Mach-Zender or Fabry-Perot interferometer and directional-coupler topologies. In particular, for fixed operational power, the use of slow-light has been shown to shrink the required device size by a factor of $(v_g/c)^2$. The SPDP system of the invention enables an additional size-reduction factor by subwavelength operation, and additionally offers dispersion management for modulated or switched signals, because the dispersion-engineering method of the invention can be employed to cancel dispersion induced onto the signal by the nonlinear device operation.

The SPDP systems of the invention can also greatly enhance the performance of a wide range of other active optical devices, such as electronic devices and thermal devices. The rate of device-optical interaction depends strongly on the number of the participating photonic states of the device, as suggested, e.g., by Fermi's Golden Rule. If Aw is the frequency bandwidth of the photonic interaction, then a figure-of-merit can be defined for a SPDP photonic structure of the invention based on the enhancement ratio, U', of the number of states existing within the frequency bandwidth, $\Delta\omega$, for this structure compared to a uniform medium, whose refractive index equals the effective index of the photonic structure at the center frequency of the interaction.

Then, using a standard analysis procedure and accounting for only one polarization state, it is found that for a dispersion relation as in Expression (2) above, with $v_{go}=0$, the associated density of 1-d and 2-d surface-polaritonic states close to $\omega_o$, for $k-k_o \ll k_o$ of a SPDP system of the invention with a 1-d-length, L, and 2-d-area, A, is given as:

$$g_{\{1d,2d\}}(\omega) = S \frac{\omega_o\{2L, k_o A\}}{2\pi c(N+1)} \left[\frac{(N+1)!}{\omega_o |D_{\omega,N+1}|}\right]^{\frac{1}{N+1}} \cdot |\omega - \omega_o|^{\frac{N}{N+1}}, \quad (9)$$

where $S = |\text{mod}(N, 2) + \text{sign}[D_{\omega,N+1} \cdot (\omega - \omega_o)]| \in \{0, 1, 2\}$.

It can be seen from Expression (9) that both the 1-d and the 2-d densities of states of the SPDP system have the same frequency dependence, which for N >1 exhibits a new type of singularity, and for N≫1 approaches the non-integrable $|\omega - \omega_o|^{-1}$, as $\omega \to \omega_o$. Therefore, by integrating Expression (9) over $\Delta\omega$ and then dividing, for each dimensionality, by the well-known number-of-states result, accounting for both polarizations. inside a uniform medium of the same dimensionality and index $ck_o/\omega_o$, an enhancement factor, U', can be given as:

$$U' = \frac{\omega_o}{ck_o} \left[ \frac{(N+1)!}{2|D_{\omega,N+1}|} \right]^{\frac{1}{N+1}} \cdot \left( \frac{\omega_o}{\Delta \omega} \right)^{\frac{N}{N+1}}. \quad (10)$$

This result is again the same for both 1-d and 2-d cases, and shows that, as the interaction bandwidth $\Delta\omega/\omega_o \ll 1$ decreases, for a system with a large N the enhancement M can be extremely large.

To correspondingly analyze the enhancement factor of a SPDP system in accordance with the invention, it is noted that, for the specific case of a zgv mode there is no theoretical upper limit on N and dispersion can be cancelled to an arbitrarily high order, because $k_o$ can in theory be arbitrarily large, leading to an extraordinary straight-horizontal-line segment of arbitrary k-length in the associated ω–k dispersion curve. In one estimate, employing SPDP structures of the examples given below, it is found that the Δω-independent prefactor in Expression (10) is ~2.5 and thus, for example, for atoms with typical due-to-collisions homogeneously-broadened linewidths $\Delta\omega/\omega_o$ of ~$10^{-8}$, the corresponding figure-of-merit is U'~$6.2 \cdot 10^6$. For this case, the radiative lifetime of the atoms is reduced approximately by this factor compared to that in a uniform medium, so even a dipole-forbidden transition could have a lifetime ~200 ps instead of its typical ~1 ms.

This enhancement is orders of magnitude better than for any other known translationally-invariant material system, and enables the SPDP system of the invention to be configured in a wide range of modern active photonic devices. The dispersion engineering methodology of the invention can be exploited to design extremely efficient light emitting devices, e.g., light emitting diodes, lasers, or other structures, at the frequency of the zgv point of a system, where the density of states is extremely enhanced as shown above, whether these systems are excited optically, electrically or thermally.

Plasmonic systems such as the SPDP devices of the invention are very strong light absorbers and thus are particularly well-suited for solar cell implementation; in addition, from Kirchhoff's law, it follows that plasmonic systems are very efficient thermal emitters and can be employed in a thermovoltaic device configuration. Conversely, the dispersion relation of the SPDP system can be tailored to design an extremely efficient light detecting device, for light at the frequency of the zgv point. Such SPDP devices do not need to be translationally invariant waveguiding structures, and instead can have the form of nanocavities or other selected geometry as described above.

Turning to fabrication of the SPDP systems of the invention described above, there can be employed any in a wide range of microelectronic and other suitable materials for fabrication of the SPDP systems. As stated above, the plasmonic material or materials can be provided as any material that is characterized by a plasma frequency in the frequency regime of interest. For example, metals, such as aluminum, or silver, for which $\lambda_p$=311 nm, gold, for which $\lambda_p$=137 nm, or copper, can be employed as plasmonic materials for optical SPDP applications. Doped semiconductors, such as silicon, germanium, gallium arsenide, and other semiconductors, are well-suited as plasmonic materials for infrared SPDP applications.

The dielectric materials of the SPDP structure can be provided as any suitable insulator or semiconductor materials. For optical or infrared SPDP applications, silicon and silicon-based microelectronic materials can be preferred, such as inorganic insulators like oxides, nitrides, or other insulating materials. Other semiconductor-technology-based inorganic dielectric materials, such as group IV materials, group III-V materials, and group II-VI semiconductors and their compounds can also be employed as the SPDP dielectric materials. Organic dielectric materials, such as polymers, plastics, and other dielectric materials can also be employed.

In fabrication of an SPDP device, e.g., a planar SPDP waveguide, the plasmonic material region or layers and the dielectric material region or layers can both be formed on a selected host structure, e.g., a host substrate, by any suitable deposition process, including, e.g., a physical vapor deposition (PVD) method such as evaporation, sputtering, or other vapor-phase process, a chemical vapor deposition (CVD) method, an atomic layer deposition (ALD) method, or other suitable deposition method. Vapor-phase deposition methods can be preferred for forming layers of metals and other amorphous and polycrystalline inorganic materials like polysilicon, polygermanium, and insulators such as oxides and nitrides.

In addition, a wide range of epitaxial methods, such as vapor phase epitaxy (VPE), liquid phase epitaxy (LPE), and molecular beam epitaxy (MBE)), can be employed for forming layers of monocrystalline inorganic materials, such as group IV, group III-V and group II-VI semiconductors and their compounds, e.g., grown on a lattice-matched semiconductor substrates.

Other layer formation techniques, including, e.g., spin-coating, and other liquid-based techniques can also be employed for forming layers of materials like organic materials such as polymers.

To define specific SPDP device geometries, standard lithographic methods can be employed, including, e.g., photolithography such as UltraViolet, Deep UltraViolet, Extreme UltraViolet, X-ray, and immersion lithographies, or maskless laser-beam, electron-beam or ion-beam lithography, or other suitable lithographic technique. In the formation of SPDP device features, dry etching, such as plasma, reactive-ion etching (RIE) and deep reactive-ion etching (DRIE) can be preferred for producing smooth, high-aspect ratio structure sidewalls.

In one example SPDP device fabrication sequence to produce the waveguide of FIG. 2 described above, the top surface of a cleaned silicon wafer is first coated with layer of a diffusion barrier material to prevent diffusion of a plasmonic material into the silicon substrate, if such diffusion is a concern. The diffusion barrier material layer can be provided as, e.g., titanium nitride, formed by, e.g., physical or chemical vapor deposition. A layer of plasmonic material, e.g., a metal, is then formed on the diffusion barrier layer. For example, a layer of silver or gold is evaporated on the diffusion barrier layer, preferably with a thickness of at least ten skin depths.

With the plasmonic material layer thusly deposited, dielectric layers of selected thicknesses are then deposited. For example, silicon oxinitride, with $\epsilon \approx 2-4$, silicon, with $\epsilon \approx 12$, and other selected dielectric layers are then deposited on the plasmonic material. In one example, atomic layer deposition (ALD) or other suitable deposition process is employed to form a stack of dielectric layers with the selected order and layer thicknesses prescribed by a dispersion relation design for the intended SPDP waveguide.

With the dielectric material layers in place, the waveguide structure geometry is formed by any suitable lithographic process. In one example process, the top layer dielectric is spin-coated with, e.g., a positive resist such as PMMA, for electron beam lithography or other suitable lithographic patterning procedure. The resist is exposed according to the selected device pattern and developed, and if desired, a selected hard mask material, such as nickel, is deposited via a physical vapor deposition process and lift-off process to form a hard etch mask. If a negative resist is employed rather than a positive resist, a hard mask is not needed for many applications. With a selected mask in place, a selective anisotropic etch, such as reactive ion etching (RIE), is then carried out to form the waveguide sidewalls, preferably optimized for smooth and vertical sidewalls, and to remove all the dielectric material layers not protected by the mask, down to the underlying plasmonic material. The hard mask is then removed from the top of the dielectric layer stack to complete fabrication of the SPDP waveguide. Processing of the dielectric layers to enable coupling to ends of the waveguide, and provision of selected dielectrics and/or insulators around the layers, can then be completed as-desired for a given application.

EXAMPLE I

An SPDP structure having a layered dielectric region adjacent to a homogeneous plasmonic material region, as in FIG. 1A, was designed. The dispersion relation engineering method described above was employed to determine a dispersion relation for the SPDP structure so that the diagram of the frequency-wavevector correspondence specifically resembled the letters "MIT." FIG. 5A is a plot of this diagram of frequency as a function of wavevector, here both normalized to the plasmonic values.

To achieve this dispersion relation, the SPDP structure was defined with the permittivity surrounding the structure set as $\epsilon=1$ and the plasmonic high-frequency permittivity set as $\epsilon_\infty=1$. It was found that nine dielectric layers were required to achieve this dispersion relation. From the top to the bottom of the stack of nine dielectric layers, the permittivities were given as $\epsilon_i=\{4, 1, 10, 1, 10, 1.7, 1, 10, 1.7\}$. The thicknesses of the nine dielectric layers, from the top to the bottom of the stack of layers, were given as $d_i/\lambda_p=\{10^{-2}, 10^{-3}, 5\cdot10^{-5}, 4\cdot10^{-6}, 3.5\cdot10^{-7}, 5\cdot10^{-8}, 2.4\cdot10^{-11}, 4\cdot10^{-12}, 6\cdot10^{-13}\}$.

Figure 5A:
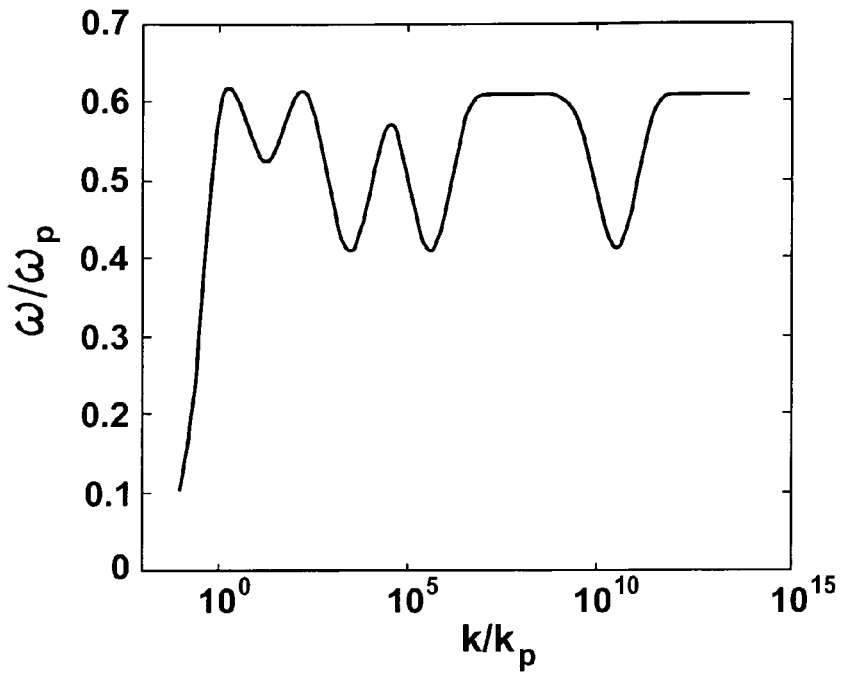
FIGS. 5A-5B are plots of the dispersion relation and group velocity dispersion, respectively, that were characteristic of a first example SPDP system designed with a structure like that of FIG. 1A.
Figure 5B:
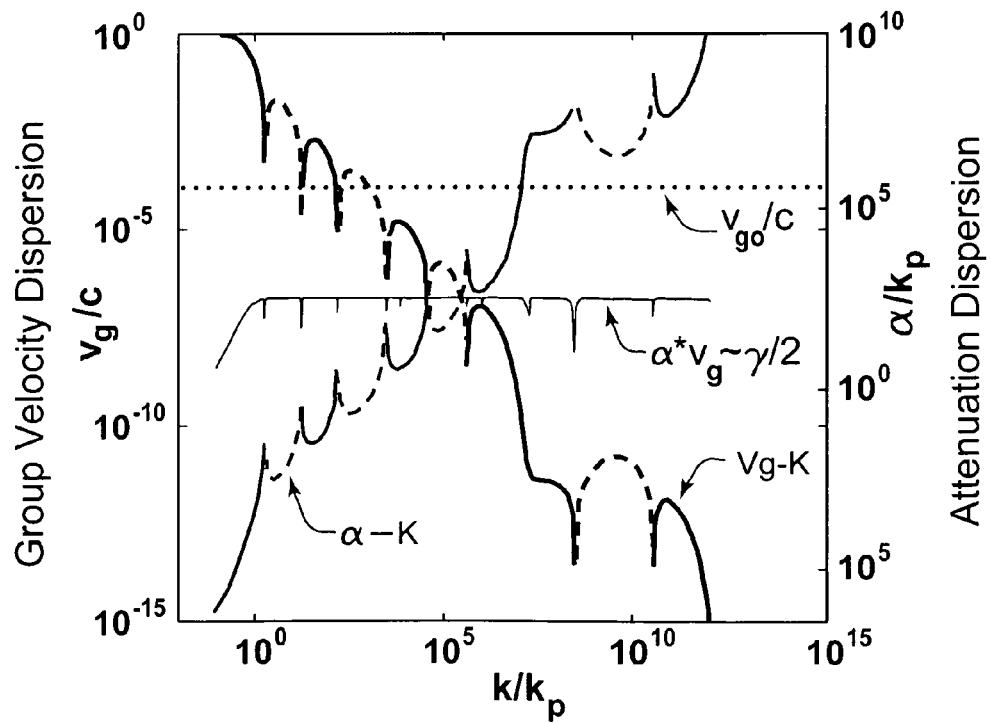

FIG. 5B is a plot of the group-velocity dispersion diagram, $v_g$–k, for this SPDP structure, obtained as the first derivative of the dispersion diagram of FIG. 5A. The solid lines and dashed lines denote that the quantity plotted logarithmically is positive or negative, respectively. Note the apparent scaling $|v_g|\sim 1/k$, in the plot. Also shown in FIG. 5B is a plot of the $\alpha$–k attenuation dispersion diagram for the SPDP structure with an added loss factor $\gamma/\omega_p=10^{-4}$: Note the apparent scaling min$|\alpha|\sim k$ and that, away from the special points of zero group velocity and for subwavelength wavevectors, $\alpha\cdot v_g=\gamma/2$ independently of wavevector, and thus frequency. The plasmonic vector $k_p=\omega_p/c$.

EXAMPLE II

An SPDP structure having a layered dielectric region adjacent to a homogeneous plasmonic material region, as in FIG. 1A, was designed as in Example I, and the dispersion relation engineering method described above was employed to determine a dispersion relation for the SPDP structure so that dispersion would be substantially suppressed to a high-order. The dispersion relation was further specified for a positive group velocity. FIG. 6A illustrates the resulting dispersion diagram, plotted as frequency as a function of wavevector, here both normalized to the plasmonic values.

To achieve this dispersion relation, the SPDP structure was defined with the permittivity surrounding the structure set as $\epsilon=1$ and the plasmonic high-frequency permittivity set as $\epsilon_\infty=1$. It was found that four dielectric layers were required to achieve this dispersion relation. From the top to the bottom of the stack of four dielectric layers, the permittivities were given as $\epsilon_i=\{4, 1, 4, 1\}$. The thicknesses of the four dielectric layers, from the top to the bottom of the stack of layers, were given as $d_i/\lambda_p=\{0.0200162, 0.00501101, 0.0086219, 0.0023344\}$. Note in the dispersion diagram the extremely linear regime around $\omega_o/\omega_p=0.5645$, $k_o/k_p=13.4$.

Figure 6B:
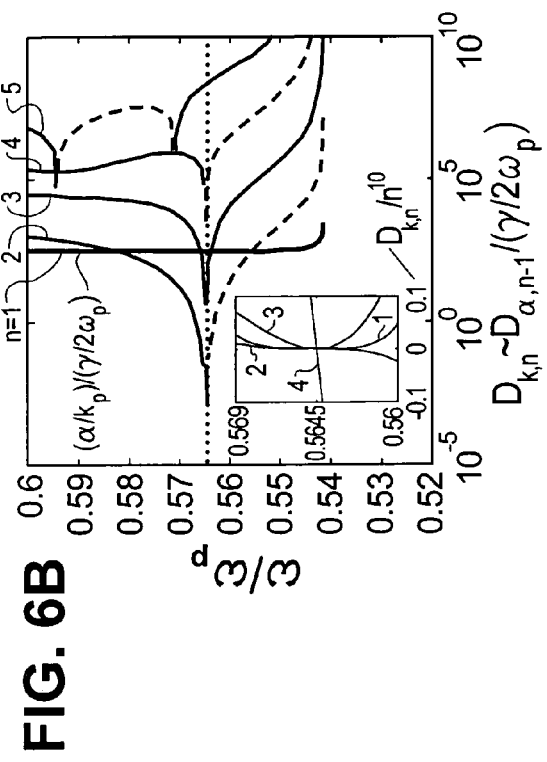
FIGS. 6A-6B are plots of the dispersion relation and group velocity dispersion, respectively, that were characteristic of a second SPDP system designed with a structure like that of FIG. 1A.
Figure 6A:
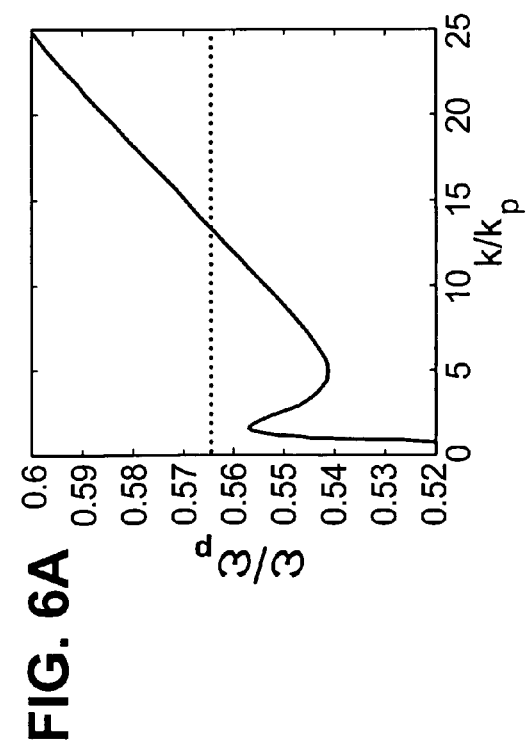

FIG. 6B is a plot of the $\omega$–$D_{k,n}$ group-velocity dispersion (gvd) diagram for the 4-layer SPDP structure, obtained as the derivative of the dispersion diagram, plotted logarithmically in the main box and linearly in the inset. Note here that gvd orders n=2 . . . 4 are cancelled at $\omega_o$ (the dotted line), where $v_{go}/c=D_{k,1}^{-1}=D_{\omega,1}=0.0032>0$, $D_{k,5}=2.11\cdot10^8$ and $D_{\omega,5}=-2.24\cdot10^{-7}$, and thus the inset depicts the behavior predicted by Expression (1) above.

Also plotted here is the $\omega$–$\alpha$ attenuation dispersion (ad) diagram for the SPDP structure with an added loss factor of $\gamma/\omega_p=10^{-4}$. Here note that, throughout the plotted frequency regime, $\alpha\cdot v_g=\gamma/2$ independently of frequency (and thus wavevector) and therefore $D_{\alpha,n-1}=D_{k,n}\cdot\gamma/2\omega_p$ implying that ad orders n–1=1 . . . 3 are also cancelled at $\omega_o$.

EXAMPLE III

An SPDP structure having a layered dielectric region adjacent to a homogeneous plasmonic material region, as in FIG. 1A, was designed as in Example I, and the dispersion relation engineering method described above was employed to determine a dispersion relation for the SPDP structure so that dispersion would be substantially suppressed to a high-order. The dispersion relation was further specified for a negative group velocity. FIG. 7A illustrates the resulting dispersion diagram, plotted as frequency as a function of wavevector, here both normalized to the plasmonic values.

To achieve this dispersion relation, the SPDP structure was defined with the permittivity surrounding the structure set as $\epsilon=1$ and the plasmonic high-frequency permittivity set as $\epsilon_\infty=1$. It was found that five dielectric layers were required to achieve this dispersion relation. From the top to the bottom of the stack of five dielectric layers, the permittivities were given as $\epsilon_i=\{4, 1, 4, 1, 4\}$. The thicknesses of the five dielectric layers, from the top to the bottom of the stack of layers, were given as $d_i/\lambda_p=\{0.02002878, 0.008302923, 0.01069271, 0.00349443, 0.004515306\}$. Note in the dispersion diagram the extremely linear regime around $\omega_o/\omega_p=0.5135$ $k_o/k_p=11.5$.

Figure 7B:
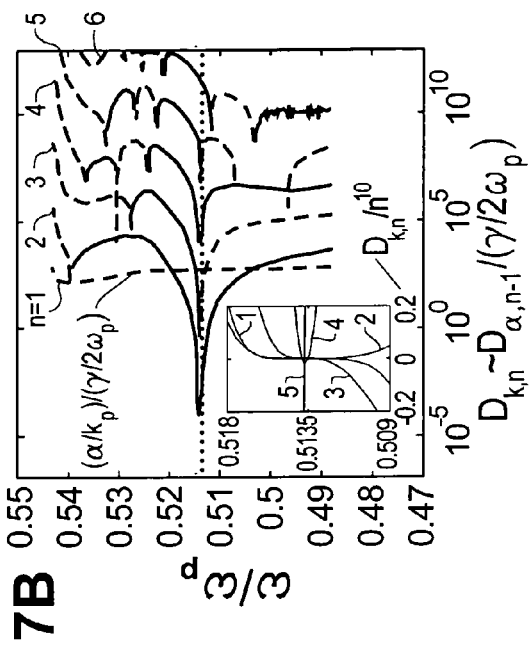
FIGS. 7A-7B are plots of the dispersion relation and group velocity dispersion, respectively, that were characteristic of a third SPDP system designed with a structure like that of FIG. 1A.
Figure 7A:
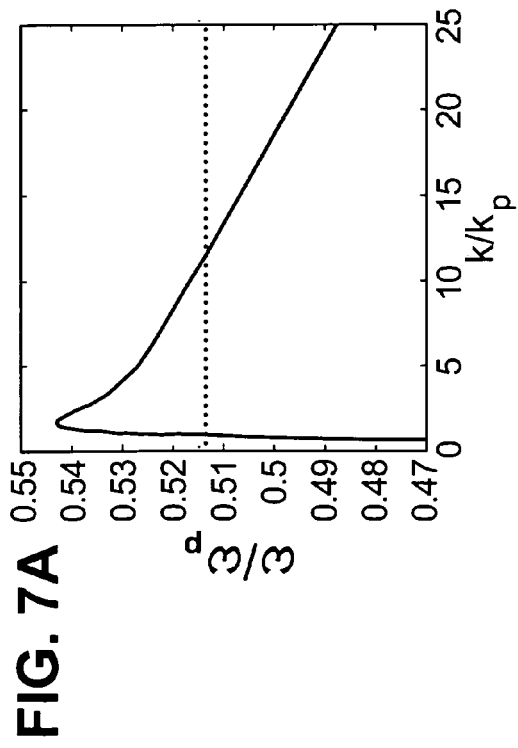

FIG. 7B is a plot of the $\omega$–$D_{k,n}$ group-velocity dispersion (gvd) diagram for the 5-layer SPDP structure, obtained as the derivative of the dispersion diagram, plotted logarithmically in the main box and linearly in the inset. Note here that gvd orders n=2 . . . 5 are cancelled at $\omega_o$ (the dotted line), where $v_{go}/c=D_{k,1}^{-1}=D_{\omega,1}=-0.0020<0$, $D_{k,6}=3.16\cdot10^{11}$, and $D_{\omega,6}=-3.96\cdot10^{-8}$, and thus the inset depicts the behavior of Expression (1) above.

Also plotted here is the $\omega$–$\alpha$ attenuation dispersion (ad) diagram for the SPDP structure with an added loss factor of $\gamma/\omega_p=10^{-4}$. Here note that, throughout the plotted frequency regime, $\alpha\cdot v_g=\gamma/2$ independently of frequency (and thus wavevector) and therefore $D_{\alpha,n-1}=D_{k,n}\cdot\gamma/2\omega_p$ implying that ad orders n–1=1 . . . 4 are also cancelled at $\omega_o$.

EXAMPLE IV

An SPDP structure having a layered dielectric region adjacent to a homogeneous plasmonic material region, as in FIG. 1A, was designed as in Example I, and the dispersion relation engineering method described above was employed to determine a dispersion relation for the SPDP structure so that dispersion would be substantially suppressed to a high-order.

The dispersion relation was further specified for a zero group velocity. FIG. 8A illustrates the resulting dispersion diagram, plotted as frequency as a function of wavevector, here both normalized to the plasmonic values.

To achieve this dispersion relation, the SPDP structure was defined with the permittivity surrounding the structure set as $\epsilon=1$ and the plasmonic high-frequency permittivity set as $\epsilon_\infty=1$. It was found that five dielectric layers were required to achieve this dispersion relation. From the top to the bottom of the stack of five dielectric layers, the permittivities were given as $\epsilon_i=\{4, 1, 4, 1, 4\}$. The thicknesses of the five dielectric layers, from the top to the bottom of the stack of layers, were given as $d_i/\lambda_p=\{0.03805142, 0.001163696, 0.021089836, 0.00016090557, 0.004449584\}$. Note in the dispersion diagram the extremely linear regime around $\omega_o/\omega_p=0.4513$, $k_o/k_p=11.3$.

FIG. 8B is a plot of the $\omega-D_{k,n}$ group-velocity dispersion (gvd) diagram for the 5-layer SPDP structure, obtained as the derivative of the dispersion diagram, plotted logarithmically in the main box and linearly in the inset. Note here that gvd orders n=2 . . . 5 are cancelled at $\omega_o$ (the dotted line), where $v_{go}/c=D_{\omega,1}=0$, $D_{\omega,5}=-6.46\cdot10^{-8}$, and thus the inset depicts the behavior of Expression (2) above.

Also plotted here is the $\Gamma$–k attenuation dispersion diagram for the same structure with an added loss factor of $\gamma/\omega_p=10^{-4}$. Note that, for large enough wavevectors, $\Gamma=\gamma/2$ independently of wavevector.

EXAMPLE V

An SPDP structure having a layered dielectric region adjacent to a homogeneous plasmonic material region, as in FIG. 1A, was designed as in Example I, and the dispersion relation engineering method described above was employed to determine a dispersion relation for the SPDP structure so that dispersion would be substantially suppressed to a high-order. The dispersion relation was further specified for a zero group velocity as in Example IV. FIG. 9A illustrates the resulting dispersion diagram, plotted as frequency as a function of wavevector, here both normalized to the plasmonic values.

To achieve this dispersion relation, the SPDP structure was defined with the permittivity surrounding the structure set as $\epsilon=1$, the plasmonic high-frequency permittivity set as $\epsilon_\infty=1$ and its loss factor as $\gamma/\omega_p=10^{-2}$. It was found that six dielectric layers were required to achieve this dispersion relation. From the top to the bottom of the stack of six dielectric layers, the permittivities were given as $\epsilon_i=\{5, 2, 5, 2, 5, 2\}$. The thicknesses of the six dielectric layers, from the top to the bottom of the stack of layers, were given as $d_i/\lambda_p=\{1.633841\cdot10^{-2}, 3.69700\cdot10^{-7}, 1.3676672\cdot10^{-2}, 1.21346\ 10^{-2}, 6.340399\cdot10^{-3}, 2.2457077\ 10^{-3}\}$. Note in the dispersion diagram the extremely linear regime around $\omega_o/\omega_p=0.4925636$, $k_o/k_p=5$.

FIG. 9B is a plot of the $D_{\omega,n}(k)$ group-velocity dispersion (gvd) diagram for the 6-layer SPDP structure, obtained as the derivative of the dispersion diagram. Note here that gvd orders 2 . . . 6 are cancelled at $k_o$ (the dotted line), where $v_{go}/c=D_{\omega,1}=0$, $D_{\omega,7}=2.14\cdot10^{-6}$, and thus the inset depicts the behavior of Expression (2) above. Also plotted here is the $\Gamma$–k attenuation dispersion diagram for the same structure. Note that, for large enough wavevectors, $\Gamma=\gamma/2$ independently of wavevector.

EXAMPLE VI

Figure 10A:
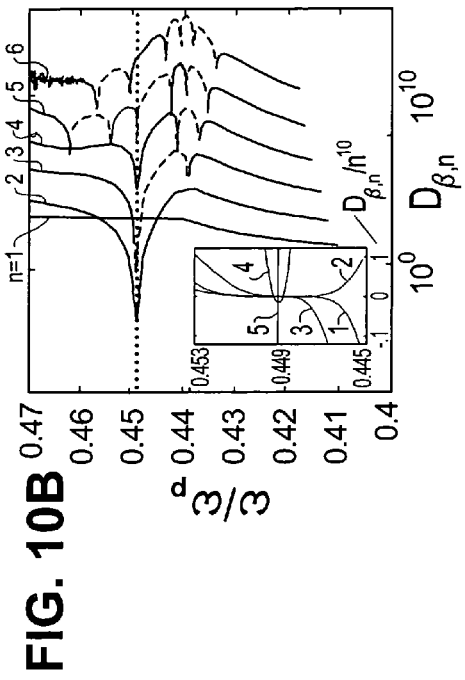
FIGS. 10A-10B are plots of the dispersion relation and group velocity dispersion, respectively, that were characteristic of a sixth SPDP system designed with a structure like that of FIG. 2.

An SPDP waveguide having a layered dielectric region adjacent to a homogeneous plasmonic material region, as in FIG. 2, was designed, and the dispersion relation engineering method described above was employed to determine a dispersion relation for the SPDP structure so that dispersion would be substantially suppressed to a high-order. FIG. 10A illustrates the resulting dispersion diagram, plotted as frequency as a function of wavevector, here both normalized to the plasmonic values.

To achieve this dispersion relation, the SPDP structure was defined with the permittivity surrounding the structure set as $\epsilon=\epsilon_c=5$ and the plasmonic high-frequency permittivity set as $\epsilon_\infty=1$, with $\omega/\lambda_p=0.1$. It was found that six dielectric layers were required to achieve this dispersion relation. From the top to the bottom of the stack of six dielectric layers, the permittivities were given as $\epsilon_i=\{2, 5, 2, 5, 1.75, 5\}$. The thicknesses of the six dielectric layers, from the top to the bottom of the stack of layers, were given as $d_i/\lambda_p=\{0.0066136, 0.0170872, 0.0021628, 0.008271, 0.000923, 0.000333\}$. Note in the dispersion diagram the extremely linear regime around $\omega_o/\omega_p=0.499$, $\beta_o/k_p=15.3$.

Figure 10B:
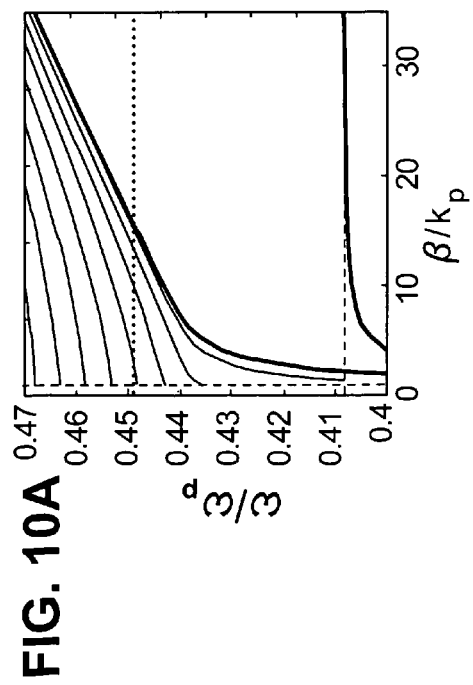

FIG. 10B is a plot of the $\omega-D_{\mu,n}$ gvd dispersion diagrams for the waveguide obtained as the derivative of the dispersion diagram, plotted logarithmically in the main box and linearly in the inset. Note that gvd orders n=2 . . . 5 are cancelled at $\omega_o$, given by the dotted line, where $v_{go}/c=D_{\mu,1}^{-1}=D_{\omega,1}=0.001>0$, $D_{\mu,6}=1.82\cdot10^{12}$, with $D_{\omega,6}=-1.66\cdot10^{-9}$, and thus the inset depicts the behavior of Expression (1).

EXAMPLE VII

Figure 11A:
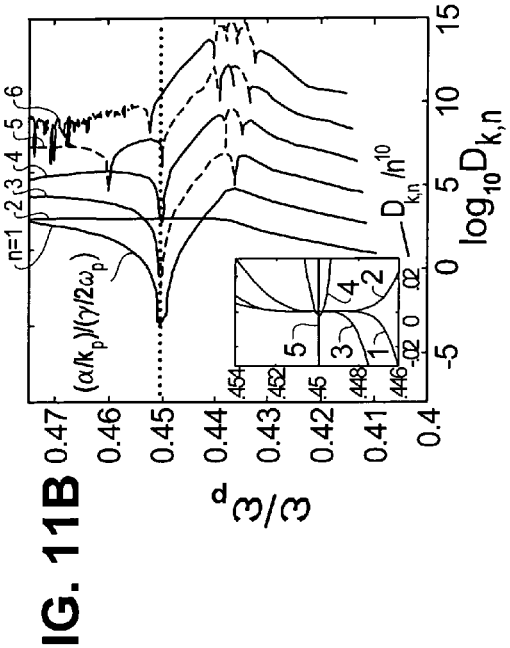
FIGS. 11A-11B are plots of the dispersion relation and group velocity dispersion, respectively, that were characteristic of a seventh SPDP system designed with a structure like that of FIG. 2.

An SPDP waveguide having a layered dielectric region adjacent to a homogeneous plasmonic material region, as in FIG. 2, was designed as in Example VI above, and the dispersion relation engineering method described above was employed to determine a dispersion relation for the SPDP structure so that dispersion would be substantially suppressed to a high-order. FIG. 11A illustrates the resulting dispersion diagram, plotted as frequency as a function of wavevector, here both normalized to the plasmonic values.

To achieve this dispersion relation, the SPDP structure was defined with the permittivity surrounding the structure set as $\epsilon=\epsilon_c=5$, the plasmonic high-frequency permittivity set as $\epsilon_\infty=1$ and its loss factor as $\gamma/\omega_p=10^{-2}$, with $\omega/\lambda_p=0.015$. It was found that five dielectric layers were required to achieve this dispersion relation. From the top to the bottom of the stack of six dielectric layers, the permittivities were given as $\epsilon_i=\{2, 5, 2, 5, 1\}$. The thicknesses of the five dielectric layers, from the top to the bottom of the stack of layers, were given as $d_i/\lambda_p=\{1.70739839\cdot10^{-3}, 8.08304642\cdot10^{-2}, 6.87700033\cdot10^{-4}, 5.09587536\ 10^{-3}, 3.104413234\cdot10^{-4}\}$. Note in the dispersion diagram the extremely linear regime around $\omega_o/\omega_p=0.45$, $k_o/k_p=17.5$.

Figure 11B:
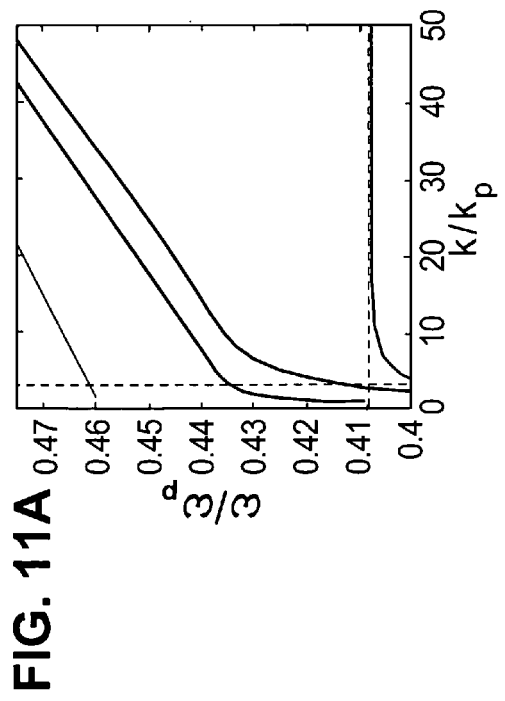

FIG. 11 is a plot of the $\omega-D_{kn}$ gvd dispersion diagrams for the waveguide obtained as the derivative of the dispersion diagram, plotted logarithmically in the main box and linearly in the inset. Note that gvd orders n=2 . . . 5 are cancelled at $\omega_o$, given by the dotted line, where $v_{go}/c=D_{k,1}^{-1}=D_{\omega,1}=10^{-3}$, with $D_{\omega,6}=3.27\cdot10^{10}$ with $D_{\omega,6}=-3.27\cdot10^{-11}$, and thus the inset depicts the behavior of Expression (1).

With these examples and the description given above it is demonstrated that the SPDP systems of the invention enable complete engineering of selected dispersion characteristics for photonic operations by the SPDP systems. It is recognized, of course, that those skilled in the art may make various modifications and additions to the processes of the invention without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. A structure for supporting propagation of surface plasmon polaritons comprising:
a plasmonic material region; and
a dielectric material region disposed adjacent to a selected surface of the plasmonic material region and having a dielectric permittivity distribution that is a function of depth through the dielectric material region;
the dielectric permittivity distribution through the dielectric material region depth including at least one range of depth values having a dielectric permittivity that is larger than dielectric permittivity at adjacent ranges of depth values to thereby impose a set of group velocities, $v_{gj}$, of alternating positive and negative sign, on a dispersion relation for a surface polaritonic mode of the structure for a corresponding set of prespecified monotonically increasing wavevectors, $k_j$, where j=1 to N and N>2.

2. The structure of claim 1 wherein the plasmonic material region comprises at least one of a metallic material, a doped semiconductor material, and a metallodielectric photonic crystal.

3. The structure of claim 1 wherein the plasmonic material region and the dielectric material region are configured to form a planar waveguide.

4. The structure of claim 1 wherein the plasmonic material region and the dielectric material region are configured to form a nonplanar waveguide.

5. The structure of claim 1 wherein the plasmonic material region and the dielectric material region are configured to form a nonlinear optical device.

6. The structure of claim 1 wherein the plasmonic material region and the dielectric material region are configured to form a cavity.

7. The structure of claim 1 wherein the plasmonic material region and the dielectric material region are configured for arrangement in an optical delay line system.

8. The structure of claim 1 wherein the plasmonic material region and the dielectric material region are configured for arrangement in an optical buffer system.

9. The structure of claim 1 wherein the plasmonic material region and the dielectric material region are configured for arrangement in an optical memory system.

10. The structure of claim 1 wherein the plasmonic material region and the dielectric material region are configured for arrangement in a laser system.

11. The structure of claim 1 wherein the plasmonic material region and the dielectric material region are configured for arrangement in a light emitting diode system.

12. The structure of claim 1 wherein the plasmonic material region and the dielectric material region are configured for arrangement in a solar cell system.

13. The structure of claim 1 wherein the plasmonic material region and the dielectric material region are configured for arrangement in a thermovoltaic device.

14. The structure of claim 1 wherein the dielectric permittivity distribution is specified as a function of depth through the dielectric region as a continuous distribution of permittivity, $\epsilon$, with $\epsilon > 0$.

15. The structure of claim 1 wherein the dielectric material region comprises a plurality of at least N−2 separate dielectric material layers each of a specified thickness and dielectric permittivity.

16. A structure for supporting propagation of surface plasmon polaritons comprising:
a plasmonic material region; and
a dielectric material region, disposed adjacent to a selected surface of the plasmonic material region and including a plurality of separate dielectric material layers each of a specified thickness and dielectric permittivity;
wherein the thickness and dielectric permittivity of each of the separate dielectric material layers is selected to impose a group velocity, $v_{go}$, on the dispersion relation for a surface polaritonic mode of the structure, with group velocity dispersion suppressed up to order N, for at least one of a specified frequency, $\omega_o$, and a specified wavevector, $k_o$, for a plurality of at least N−1 separate dielectric material layers.

17. The structure of claim 16 wherein the surface polaritonic mode is a slow-light mode, and the normalized group velocity is $|v_{go}|/c < 0.1$, where c is the speed of light in free space.

18. The structure of claim 16 wherein the surface polaritonic mode is characterized by subwavelength propagation, and the normalized phase velocity is $\omega_o/ck_o < 0.2$, where c is the speed of light in free space.

19. The structure of claim 16 wherein the group velocity, $v_{go}$, is negative.

20. The structure of claim 16 wherein the group velocity, $v_{go}$, is zero.

21. The structure of claim 16 wherein the thickness and dielectric permittivity of each of the separate dielectric material layers is further selected to impose on the dispersion relation for a surface polaritonic mode of the structure an attenuation constant, $\alpha_o$, with attenuation dispersion suppressed up to order N−1, at the frequency and wavevector of the group velocity dispersion suppression.

22. A structure for supporting propagation of surface plasmon polaritons comprising:
a dielectric material region; and
a plasmonic material region, disposed adjacent to a selected surface of the dielectric material region and having a plasmonic-material dielectric permittivity distribution that is a function of depth through the plasmonic material region;
the plasmonic-material dielectric permittivity distribution through the plasmonic material region depth including at least one range of depth values having a dielectric permittivity that is larger than dielectric permittivity at adjacent ranges of depth values, to thereby impose a set of group velocities, $v_{gj}$, of alternating positive and negative sign, on a dispersion relation for a surface polaritonic mode of the structure for a corresponding set of prespecified monotonically increasing wavevectors, $k_j$, where j=1 to M and M>2.

23. The structure of claim 22 wherein the plasmonic material region permittivity distribution is specified as a function of depth through the plasmonic material region as a continuous distribution of plasmonic permittivity, $\epsilon_p$, with $\epsilon_p < 0$.

24. The structure of claim 22 wherein the plasmonic material region comprises a plurality of at least M−2 separate plasmonic material layers each of a specified thickness and plasmonic-material dielectric permittivity.

25. A structure for supporting propagation of surface plasmon polaritons comprising:
a dielectric material region; and
a plasmonic material region, disposed adjacent to a selected surface of the dielectric material region and including a plurality of separate plasmonic material layers each of a specified thickness and dielectric permittivity;

wherein the thickness and plasmonic-material dielectric permittivity of each of the separate plasmonic material layers is selected to impose a group velocity, $v_{go}$, on the dispersion relation for a surface polaritonic mode of to the structure, with group velocity dispersion suppressed up to order M, for at least one of a specified frequency, $\omega_o$, and a specified wavevector, $k_o$, for a plurality of at least M−1 separate plasmonic material layers.

26. A structure for supporting propagation of surface plasmon polaritons comprising:
a plasmonic material region; and
a dielectric material region disposed adjacent to a selected surface of the plasmonic material region;
at least one of the plasmonic material region and the dielectric material region having a dielectric permittivity distribution that is specified as a function of depth through the corresponding material region;
said dielectric permittivity distribution including at least one range of depth values having a dielectric permittivity that is larger than dielectric permittivity at adjacent ranges of depth values, to thereby impose a set of group velocities, $v_{gj}$, of alternating positive and negative sign, on a dispersion relation for a surface polaritonic mode of the structure for a corresponding set of prespecified monotonically increasing wavevectors, $k_j$, where j=1 to N and N>2.

27. The structure of claim 26 wherein the plasmonic material region comprises a plurality of at least N−2 separate plasmonic material layers each of a specified thickness and plasmonic-material dielectric permittivity.

28. The structure of claim 26 wherein the dielectric material region comprises a plurality of at least N−2 separate dielectric material layers each of a specified thickness and dielectric permittivity.

29. A structure for supporting propagation of surface plasmon polaritons comprising:
a plasmonic material region; and
a dielectric material region disposed adjacent to a selected surface of the plasmonic material region;
at least one of the plasmonic material region and the dielectric material region having a dielectric permittivity distribution that is specified as a function of depth through the corresponding material region;
said dielectric permittivity distribution including at least one range of depth values having a dielectric permittivity that is larger than dielectric permittivity at adjacent ranges of depth values, to thereby impose a group velocity, $v_{go}$, on the dispersion relation for a surface polaritonic mode of the structure, with group velocity dispersion suppressed up to order N, for at least one of a specified frequency, coo, and a specified wavevector, $k_o$.

30. The structure of claim 29 wherein the plasmonic material region comprises a plurality of at least N−1 separate plasmonic material layers each of a specified thickness and plasmonic-material dielectric permittivity.

31. The structure of claim 29 wherein the dielectric material region comprises a plurality of at least N−1 separate dielectric material layers each of a specified thickness and dielectric permittivity.

32. The structure of claim 29 wherein the plasmonic material region and the dielectric material region are configured to form a waveguide.

33. The structure of claim 29 wherein the plasmonic material region and the dielectric material region are configured to form a nonlinear optical device.

34. The structure of claim 29 wherein the plasmonic material region and the dielectric material region are configured to form a cavity.

35. A surface plasmon polariton waveguide comprising:
a plasmonic material region; and
a dielectric material region, disposed adjacent to a selected surface of the plasmonic material region and including a plurality of separate dielectric material layers each of a specified thickness and dielectric permittivity;
the thickness and dielectric permittivity of each of the separate dielectric material layers being selected to impose a group velocity, $v_{go}$, on the dispersion relation for a surface polaritonic mode of the structure, with group velocity dispersion suppressed up to order N, for at least one of a specified frequency, $\omega_o$, and a specified wavevector, $k_o$, for a number of at least N−1 dielectric material layers.

36. A surface plasmon polariton waveguide comprising:
a plasmonic material region; and
a dielectric material region, disposed adjacent to a selected surface of the plasmonic material region and including a plurality of separate dielectric material layers each of a specified thickness and dielectric permittivity;
the thickness and dielectric permittivity of each of the separate dielectric material layers including at least one dielectric material layer having a dielectric permittivity that is higher than dielectric permittivity of adjacent dielectric material layers to thereby impose a set of group velocities, $v_{gj}$, of alternating positive and negative sign, on a dispersion relation for a surface polaritonic mode of the structure for a corresponding set of prespecified monotonically increasing wavevectors, $k_j$, where j=1 to N and N>2, for a number of at least N−2 dielectric material layers.

* * * * *